US010127214B2

(12) United States Patent
Munro et al.

(10) Patent No.: US 10,127,214 B2
(45) Date of Patent: Nov. 13, 2018

(54) METHODS FOR GENERATING NATURAL LANGUAGE PROCESSING SYSTEMS

(71) Applicant: Idibon, Inc., San Francisco, CA (US)

(72) Inventors: Robert J. Munro, San Francisco, CA (US); Schuyler D. Erle, San Francisco, CA (US); Christopher Walker, San Francisco, CA (US); Sarah K. Luger, San Francisco, CA (US); Jason Brenier, Oakland, CA (US); Gary C. King, Los Altos, CA (US); Paul A. Tepper, San Francisco, CA (US); Ross Mechanic, San Francisco, CA (US); Andrew Gilchrist-Scott, Berkeley, CA (US); Jessica D. Long, San Francisco, CA (US); James B. Robinson, San Francisco, CA (US); Brendan D. Callahan, Philadelphia, PA (US); Michelle Casbon, San Antonio, TX (US); Ujjwal Sarin, San Francisco, CA (US); Aneesh Nair, Fremont, CA (US); Veena Basavaraj, San Francisco, CA (US); Tripti Saxena, Cupertino, CA (US); Edgar Nunez, Union City, CA (US); Martha G. Hinrichs, San Francisco, CA (US); Haley Most, San Francisco, CA (US); Tyler J. Schnoebelen, San Francisco, CA (US)

(73) Assignee: Sansa AI Inc., San Francisco, CA (US)

( * ) Notice: Subject to any disclaimer, the term of this patent is extended or adjusted under 35 U.S.C. 154(b) by 0 days.

(21) Appl. No.: 14/964,517

(22) Filed: Dec. 9, 2015

(65) Prior Publication Data
US 2016/0162456 A1 Jun. 9, 2016

Related U.S. Application Data

(60) Provisional application No. 62/089,736, filed on Dec. 9, 2014, provisional application No. 62/089,742, filed
(Continued)

(51) Int. Cl.
*G06F 17/24* (2006.01)
*G06F 17/30* (2006.01)
(Continued)

(52) U.S. Cl.
CPC .......... *G06F 17/241* (2013.01); *G06F 3/0482* (2013.01); *G06F 17/2241* (2013.01);
(Continued)

(58) Field of Classification Search
None
See application file for complete search history.

(56) References Cited

U.S. PATENT DOCUMENTS 7,664,746 B2 * 2/2010 Majumder ........ G06F 17/30867
707/732
8,682,649 B2 * 3/2014 Bellegarda .............. G10L 13/10
704/10

(Continued)

OTHER PUBLICATIONS

Zhao, Ying, George Karypis, and Usama Fayyad. "Hierarchical clustering algorithms for document datasets." Data mining and knowledge discovery10.2 (2005): 141-168.*
(Continued)

*Primary Examiner* — Pierre-Louis Desir
*Assistant Examiner* — Jonathan Kim
(74) *Attorney, Agent, or Firm* — K&L Gates LLP; Jordan A. Kwan

(57) ABSTRACT

Methods are presented for generating a natural language model. The method may comprise: ingesting training data representative of documents to be analyzed by the natural
(Continued)

language model, generating a hierarchical data structure comprising at least two topical nodes within which the training data is to be subdivided into by the natural language model, selecting a plurality of documents among the training data to be annotated, generating an annotation prompt for each document configured to elicit an annotation about said document indicating which node among the at least two topical nodes said document is to be classified into, receiving the annotation based on the annotation prompt; and generating the natural language model using an adaptive machine learning process configured to determine patterns among the annotations for how the documents in the training data are to be subdivided according to the at least two topical nodes of the hierarchical data structure.

19 Claims, 22 Drawing Sheets

Related U.S. Application Data on Dec. 9, 2014, provisional application No. 62/089,745, filed on Dec. 9, 2014, provisional application No. 62/089,747, filed on Dec. 9, 2014.

(51) Int. Cl.
- *G06F 17/28* (2006.01)
- *G06F 17/22* (2006.01)
- *G06F 3/0482* (2013.01)
- *G06F 17/27* (2006.01)
- *G06Q 50/00* (2012.01)

(52) U.S. Cl.
CPC ........ *G06F 17/272* (2013.01); *G06F 17/2785* (2013.01); *G06F 17/28* (2013.01); *G06F 17/2809* (2013.01); *G06F 17/30401* (2013.01); *G06F 17/30445* (2013.01); *G06F 17/30598* (2013.01); *G06F 17/30604* (2013.01); *G06F 17/30654* (2013.01); *G06F 17/30705* (2013.01); *G06F 17/30734* (2013.01); *G06F 17/30864* (2013.01); *G06Q 50/01* (2013.01)

(56) References Cited

U.S. PATENT DOCUMENTS

| | | | |
|---|---|---|---|
| 8,838,606 B1* | 9/2014 | Cormack | G06N 99/005 705/311 |
| 2001/0047290 A1* | 11/2001 | Petras | G06F 17/30699 707/749 |
| 2003/0212544 A1* | 11/2003 | Acero | G06F 17/241 704/9 |
| 2007/0150802 A1* | 6/2007 | Wan | G06F 17/241 715/205 |
| 2008/0126971 A1* | 5/2008 | Kojima | G06F 3/0482 715/771 |
| 2008/0168055 A1* | 7/2008 | Rinearson | G06F 17/30997 |
| 2008/0243827 A1* | 10/2008 | Sarma | G06F 17/30528 |
| 2009/0044107 A1* | 2/2009 | Bandera | G06F 3/0482 715/700 |
| 2009/0234843 A1* | 9/2009 | Ito | G06F 17/30713 |
| 2010/0153318 A1* | 6/2010 | Branavan | G06F 17/241 706/12 |
| 2010/0293451 A1 | 11/2010 | Carus | |
| 2010/0312725 A1* | 12/2010 | Privault | G06N 5/043 706/12 |
| 2011/0029517 A1* | 2/2011 | Ji | G06F 17/30864 707/734 |
| 2011/0029525 A1* | 2/2011 | Knight | G06F 17/30713 707/737 |
| 2012/0095943 A1* | 4/2012 | Yankov | G06N 99/005 706/12 |
| 2012/0271774 A1* | 10/2012 | Clegg | G06Q 10/1053 705/321 |
| 2013/0151238 A1* | 6/2013 | Beaurpere | G06F 17/28 704/9 |
| 2013/0218835 A1* | 8/2013 | Greenspan | G06F 17/301 707/610 |
| 2014/0032657 A1* | 1/2014 | Johnmar | H04L 67/22 709/204 |
| 2014/0188665 A1 | 7/2014 | Baker et al. | |
| 2014/0257990 A1* | 9/2014 | Cudgma | G06Q 30/0269 705/14.66 |
| 2014/0289323 A1* | 9/2014 | Kutaragi | G06Q 50/01 709/203 |
| 2014/0337257 A1 | 11/2014 | Chatterjee et al. | |
| 2015/0032443 A1 | 1/2015 | Karov et al. | |
| 2015/0106078 A1* | 4/2015 | Chang | G06F 17/30705 704/9 |
| 2016/0125042 A1* | 5/2016 | Laredo | G06F 8/33 707/723 |

OTHER PUBLICATIONS

Zhao (Zhao, Ying, George Karypis, and Usama Fayyad. "Hierarchical clustering algorithms for document datasets." Data mining and knowledge discovery10.2 (2005): 141-168).*

* cited by examiner

FIG. 11A

Work Unit #1

February 26: NorthStar Realty Finance Announces Plan to Spin-off European Real Estate Business into a Separate Publicly-Traded REIT February 25: Northstar Realty Finance: Chatham Lodging Trust Caps Record Year with Strong Fourth Quarter To view Conference Call-transcripts, click http://www.buysellsignals.net/BuySellSignals /report/Jsersys/Stock/Daily /Link/1079_SSR_ConferenceCalltranscripts.html 27 Feb, 2015: Northstar Realty Finance's (NRF) CEO David Hamamoto on Q4 2014 Results - Earnings Call Transcript 27 Feb, 2015: Northstar Realty Finance (NRF) Q4 2014 Results – Earnings Call Webcast

ISIN: US6670401005

N:NRF; NRF.N

Source: www.BuySellSignals.com

Relevance

What is the best label for this document?

○ Highly_relevant (Highly_relevant)
○ Semi-relevant (Semi-relevant)
○ Totally_irrelevant (Totally_irrelevant)

[Submit]

FIG. 11B

METHODS FOR GENERATING NATURAL LANGUAGE PROCESSING SYSTEMS

CROSS REFERENCES TO RELATED APPLICATIONS

This application claims the benefits of U.S. Provisional Application 62/089,736, filed Dec. 9, 2014, and titled, "METHODS AND SYSTEMS FOR ANNOTATING NATURAL LANGUAGE PROCESSING," U.S. Provisional Application 62/089,742, filed Dec. 9, 2014, and titled, "METHODS AND SYSTEMS FOR IMPROVING MACHINE PERFORMANCE IN NATURAL LANGUAGE PROCESSING," U.S. Provisional Application 62/089,745, filed Dec. 9, 2014, and titled, "METHODS AND SYSTEMS FOR IMPROVING FUNCTIONALITY IN NATURAL LANGUAGE PROCESSING," and U.S. Provisional Application 62/089,747, filed Dec. 9, 2014, and titled, "METHODS AND SYSTEMS FOR SUPPORTING NATURAL LANGUAGE PROCESSING," the disclosures of which are incorporated herein by reference in their entireties and for all purposes.

This application is also related to US non provisional application Ser. No. 14/964,518, titled "ARCHITECTURES FOR NATURAL LANGUAGE PROCESSING," Ser. No. 14/964,520, titled "OPTIMIZATION TECHNIQUES FOR ARTIFICIAL INTELLIGENCE," Ser. No. 14/964,522, titled "GRAPHICAL SYSTEMS AND METHODS FOR HUMAN-IN-THE-LOOP MACHINE INTELLIGENCE," Ser. No. 14/964,510, titled "METHODS AND SYSTEMS FOR IMPROVING MACHINE LEARNING PERFORMANCE," Ser. No. 14/964,511, titled "METHODS AND SYSTEMS FOR MODELING COMPLEX TAXONOMIES WITH NATURAL LANGUAGE UNDERSTANDING," Ser. No. 14/964,512, titled "AN INTELLIGENT SYSTEM THAT DYNAMICALLY IMPROVES ITS KNOWLEDGE AND CODE-BASE FOR NATURAL LANGUAGE UNDERSTANDING," Ser. No. 14/964,525, titled "METHODS AND SYSTEMS FOR LANGUAGE-AGNOSTIC MACHINE LEARNING IN NATURAL LANGUAGE PROCESSING USING FEATURE EXTRACTION," Ser. No. 14/964,526, titled "METHODS AND SYSTEMS FOR PROVIDING UNIVERSAL PORTABILITY IN MACHINE LEARNING," and Ser. No. 14/964,528, titled "TECHNIQUES FOR COMBINING HUMAN AND MACHINE LEARNING IN NATURAL LANGUAGE PROCESSING," each of which are filed concurrently herewith, and the entire contents and substance of all of which are hereby incorporated in total by reference in their entireties and for all purposes.

TECHNICAL FIELD

The subject matter disclosed herein generally relates to processing data. In some example embodiments, the present disclosures relate to methods for generating natural language models.

BACKGROUND

It has long been a goal to program machines to process human-readable language, sometimes in part as an effort to generate artificial intelligence. However, programming computers to process human-readable language has proven to be far more difficult than imagined, particularly as languages continue to change and evolve, and the meaning of words and phrases are more ambiguous and nuanced than assumed. A number of techniques are available for processing natural language by computers, but the methods for generating these models either are inaccurate and imprecise or require months of refinement and programming to accurately model specific subject areas of language. It is desirable, therefore, to develop improved methods for generating natural language models that are accurate and quick while also reducing human time spent generating the models.

BRIEF SUMMARY

In some embodiments, a method for generating a natural language model is presented. The method may include: ingesting, by a natural language platform comprising at least one processor coupled to at least one memory, training data representative of documents to be analyzed by the natural language model; generating, by the natural language platform and based on topical content within the training data, a hierarchical data structure, the hierarchical data structure comprising at least two topical nodes, wherein at least two topical nodes represent partitions organized by two or more topical themes among the topical content of the training data within which the training data is to be subdivided into; selecting among the training data, by the natural language platform, a plurality of documents to be annotated; generating, by the natural language platform, at least one annotation prompt for each document among the plurality of documents to be annotated, said annotation prompt configured to elicit an annotation about said document indicating which node among the at least two topical nodes of the hierarchal data structure said document is to be classified into; causing display of, by the natural language platform, at least one annotation prompt for each document among the plurality of documents to be annotated; receiving, by the natural language platform, for each document among the plurality of documents to be annotated, the annotation in response to the displayed annotation prompt; and generating, by the natural language platform, the natural language model using an adaptive machine learning process configured to determine, among the received annotations, patterns for how the documents in the training data are to be subdivided according to the at least two topical nodes of the hierarchical data structure.

In some embodiments, the method further includes testing, by the natural language platform, performance of the natural language model using a subset of the documents among the training data that received annotations.

In some embodiments, the method further includes: computing, by the natural language platform, a performance metric of the natural language model, based on results of the testing; and determining whether the natural language model satisfies at least one performance criterion based on the computed performance metric.

In some embodiments, the method further includes performing, by the natural language platform, one or more optimization techniques configured to improve performance of the natural language platform, in response to determining that the natural language platform fails to satisfy the at least one performance criterion based on the computed performance metric.

In some embodiments of the method, the one or more optimization techniques comprises at least one of: a feature selection process, a padding and rebalancing process of the natural language model, a pruning process of the natural language model, a feature discovery process, a smoothing process of the natural language model, or a model interpolation process.

In some embodiments, the method further includes determining that the natural language platform fails to satisfy the at least one performance criterion based on the computed performance metric; in response to said determining: identifying a topical node among the two or more topical nodes of the hierarchal data structure that the natural language model fails to accurately categorize documents into; selecting a second plurality of documents to be annotated, the second plurality comprising documents associated with said topical node that the natural language model failed to accurately categorize documents into; generating a second set of at least one annotation prompt for each document among the second plurality of documents to be annotated, said annotation prompt among the second set configured to elicit an annotation about said document to improve the natural language model in accurately categorizing documents into said topical node; causing display of the second set of the at least one annotation prompt for each document among the second plurality of documents to be annotated; receiving, by the natural language platform, for each document among the second plurality of documents to be annotated, a second set of annotations in response to the second set of displayed annotation prompts; and generating, by the natural language platform, a refined natural language model using the adaptive machine learning process and based on the hierarchical data structure, the training data and the second set of annotations.

In some embodiments of the method, generating the hierarchical data structure comprises performing a topic modeling process configured to identify two or more topics among the content of the training data that is configured to define the two or more topical nodes of the hierarchical data structure.

In some embodiments, the method further includes accessing one or more rules configured to instruct the natural language model how to categorize one or more documents into the two or more nodes of the hierarchical data structure.

In some embodiments of the method, generating the hierarchical data structure comprises: conducting a rules generation process configured to evaluate logical consistency among the one or more rules.

In some embodiments of the method, generating the hierarchical data structure comprises: generating, by the natural language platform, at least one annotation prompt for each topical node among the two or more topical nodes in the hierarchical data structure, said annotation prompt configured to elicit an annotation about said topical node indicating a level of accuracy of placement of the node within the hierarchical data structure; causing display of, by the natural language platform, the at least one annotation prompt for each topical node; and receiving, by the natural language platform, for each topical node, the annotation in response to the displayed annotation prompt.

In some embodiments, the method further includes evaluating performance of the hierarchical data structure based on the annotations. In some embodiments, the method further includes, in response to the evaluating, determining that the hierarchical data structure fails to satisfy at least one performance criterion; and modifying a logical relationship among the two or more topical nodes based on the annotations and in response to determining that the data structure fails to satisfy the at least one performance criterion.

In some embodiments, the method further includes generating a training guideline based on the annotations to the nodes, the training guideline configured to provide instructions to an annotator for answering one or more annotation prompts for each document among the plurality of documents to be annotated.

In some embodiments of the method, the hierarchical data structure comprises at least a third topical node and a fourth topical node, wherein the third and fourth topical nodes both represent sub-partitions within the topical theme of the first node and organized by a third and fourth topical theme, respectively, among the topical content of the training data within which the training data is to be subdivided into.

In some embodiments, another method for updating a natural language model is presented. This method may include: utilizing the natural language model to identify topical content of untested data and to classify said untested data into at least two topical nodes of a hierarchical data structure according to the identified topical content of the untrained data, the hierarchical data structure comprising the at least two topical nodes, wherein the at least two topical nodes represent partitions organized by two or more topical themes among the topical content of the untested data within which the untested data is to be subdivided into; determining that the natural language model classifies at least a subset of the untested data into the at least two topical nodes with a low degree of certainty; and modifying the natural language model with updated data, the updated data comprising a subset of the untested data that the natural language model has classified with a low degree of certainty.

In some embodiments, a non-transitory computer readable medium is presented comprising instructions that, when executed by a processor, cause the processor to perform operations comprising: ingesting training data representative of documents to be analyzed by a natural language model; generating a hierarchical data structure, the hierarchical data structure comprising at least two topical nodes, wherein the at least two topical nodes represent partitions organized by two or more topical themes among the topical content of the training data within which the training data is to be subdivided into; selecting among the training data a plurality of documents to be annotated; generating at least one annotation prompt for each document among the plurality of documents to be annotated, said annotation prompt configured to elicit an annotation about said document indicating which node among the at least two topical nodes of the hierarchal data structure said document is to be classified into; causing display of the at least one annotation prompt for each document among the plurality of documents to be annotated; receiving for each document among the plurality of documents to be annotated, the annotation in response to the displayed annotation prompt; and generating the natural language model using an adaptive machine learning process configured to determine, among the received annotations, patterns for how the documents in the training data are to be subdivided according to the at least two topical nodes of the hierarchical data structure.

BRIEF DESCRIPTION OF THE DRAWINGS

Some embodiments are illustrated by way of example and not limitation in the figures of the accompanying drawings.

FIGS. 11A and 11B show example displays for annotating as part of the adaptive machine learning process, according to some embodiments.

DETAILED DESCRIPTION

Figure 1A:
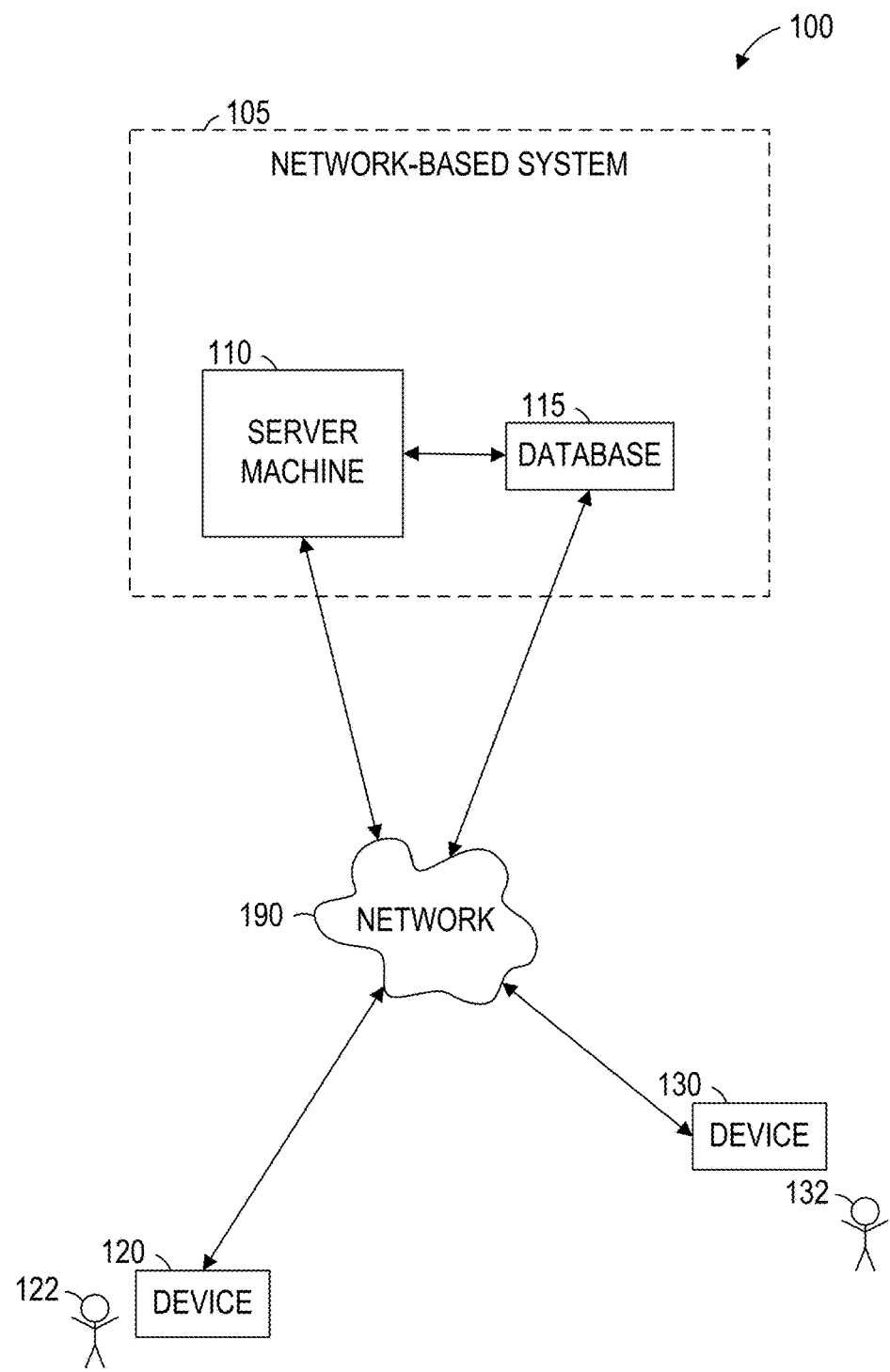
FIG. 1A is a network diagram illustrating an example network environment suitable for aspects of the present disclosure, according to some example embodiments.

Example methods, apparatuses, and systems (e.g., machines) are presented for generating natural language models.

The modes of human communications brought upon by digital technologies have created a deluge of information that can be difficult for human readers to handle alone. Companies and research groups may want to determine trends in the human communications to determine what people generally care about for any particular topic, whether it be what car features are being most expressed on Twitter®, what political topics are being most expressed on Facebook®, what people are saying about the customer's latest product in their customer feedback page, what are the key categories written about in a large body of legal documents, and so forth. In some cases, the companies or the research groups may want to determine what are the general topics being talked about, to begin with. It may be desirable for companies to aggregate and then synthesize the thousands or even millions of human communications from the many different modes available in the digital age (e.g., Twitter®, transcribed speech, email, OCR-ed text, etc.) to determine these objectives. Processing all this information by humans alone can be overwhelming and cost-inefficient. Methods today may therefore rely on computers to apply natural language processing in order to analyze the many human communications available in order to filter, organize, interpret, categorize, ask questions, respond to questions, and extract information from the many human communications into digestible patterns of communication.

Conventionally, natural language processing may involve humans declaring a large number of rules for the natural language model to follow. For example, when trying to determine how many communications convey negative sentiment about a politician, a rule may be generated to search for "horrible" and "Bill Clinton" in the same document. Similarly, a rule looking for the terms "wonderful" and "Bill Clinton" may attempt to find all the communications conveying positive sentiment about a politician. Conventionally, the natural language model may then parse a given number of documents, follow the rules, and attempt to categorize the documents by the rules. However, it can become clear that the number of rules necessary to capture all forms of negative and positive sentiment may be immeasurable, as there alone are simply dozens of synonyms for the words "bad" and "good," not to mention all the slang terms, and sentiment conveyed by a combination of words that may not be captured by any singular rule. Generally, performing natural language processing through a rules-only approach oftentimes fails to adequately and reliably categorize human communications in a meaningful way.

Alternately, natural language processing may involve applying machine-learning techniques to a set of example documents that have been categorized by human annotators, generating statistical inferences for the natural language model to follow. For example, a collection of documents written about "Bill Clinton" may include a subset of those documents understood and categorized by a human as conveying negative sentiment, and a second subset of documents understood and categorized as conveying positive sentiment. In this way, the natural language models generated through machine learning approaches are able to recognize many more characteristics of sentiment-conveying text than can be reasonably implemented through rules-only approaches. Accordingly, the accuracy of such models at categorizing human communications may be substantially higher than rules-based natural language processing approaches. However, conventionally, the use of machine learning for performing natural language processing requires human annotators to label hundreds or even thousands of example documents before the natural language models achieve a satisfactory level of accuracy. Therefore, it is desirable to use more effective natural language processing techniques to rapidly develop natural language models that efficiently and accurately summarize the thousands or millions of human communications.

Aspects of the present disclosure are presented for generating natural language models (also referred to herein as prediction engines) through a combination of processing human annotations of documents and adaptive machine learning techniques that determine patterns in the documents, based in part on the human annotations applied to the documents. The natural language platform used to generate the models, such as a software system stored in memory of one or more servers communicatively coupled in parallel, may be configured to dynamically generate human readable annotation prompts that may be expressed in varying levels of detail and granularity so as to efficiently obtain specific annotation information and maximize use of a human annotator's time. An iterative or cyclic process, involving cycling between supplying prompts for human annotations to documents and obtaining the annotations, then generating the natural language model using machine learning of the documents with the annotations, then evaluating the model and iterating back to obtaining more human annotations to refine the model, and so forth, is also presented.

As an example, the human annotations may assist the machine learning techniques to resolve inevitable ambiguities in the human communications, as well as provide intelligence or meaning to communications that the machine does not accurately comprehend a priori. The human annotations can then enable a natural language platform configured to generate these natural language models to provide better natural language results of the human communications, which can then in turn be better refined with the assistance of more human annotations as necessary. For example, a human annotator may provide an annotation about a Tweet reading "Can you believe this guy?!" as expressing negative sentiment of the person being referenced, while a rule may fail to flag this Tweet as having negative sentiment because no typical negative words are contained in the Tweet.

In some embodiments, the natural language platform used to generate the natural language models may be configured to generate human readable annotation prompts at varying degrees of detail, so as to elicit responses from human annotators that match more specifically a level of ambiguity the natural language platform is trying to resolve. For example, a first level of annotation prompts may include determining what subject category (or categories) a document may be categorized into, among a plurality of first categories. This first level may therefore generate a prompt to the human annotator that includes a multiple choice question including three or more categories that the human annotator may choose from, where the human annotator may be prompted to select among any or all of the categories. As another example, a second level of annotation prompts may include determining what subject category a document may be best categorized into, among a plurality of second categories. This second level may therefore generate a prompt displayable to the human annotator that includes a multiple-choice question including three or more categories that the human annotator may choose from, where the human annotator may be prompted to select only one category that best describes the document. As another example, a third level of annotation prompts may include supplying a binary decision to the human annotator, such as asking whether it fits into a category or not (e.g., a yes or no or a true or false question).

Depending on the amount and precision of information that the natural language model has already obtained, the natural language platform may dynamically adjust the type of annotation prompts to supply to human annotators. For example, if the natural language model possesses little information about a document or a category of documents, the natural language platform may be configured to supply a more open ended question to human annotators, such as an annotation prompt at the first level. On the other hand, if the natural language model possesses precise information about a document or a category of documents, the natural language platform may be configured to supply a more precise question to the human annotators, such as an annotation prompt at the third level. In this way, information to improve the natural language model may be more efficiently obtained and may maximize the use of human annotators' time.

In addition, aspects of the present disclosure may construct natural language models based on this iterative process that can be specifically tailored to a customer's unique needs or subject matter area. For example, the words important to categorizing communications in biotechnology may be different than the words important to categorizing communications in the automobile industry. The biotechnology user may desire to tailor a natural language model to better understand articles related to biotechnology, while the automobile industry user may desire to tailor the same or a different natural language model to better understand customer feedback emails. As another example, the language, grammar, and idioms used in social media may vary drastically from communications in professional writings, e.g., legal or medical journals. A user focusing on Twitter® communications may desire to tailor the natural language model to better determine when tweets of adolescent teens convey positive sentiment or negative sentiment, while a user focusing on legal documents may desire to tailor a natural language model to better understand whether a legal decision is favorable or unfavorable, and to see how many scholarly articles are written about the legal decision and what percentage of them are critical of the legal decision. Aspects of the present disclosure therefore are robust enough to generate a natural language model to interpret documents in any language (or languages) and for any number of topics or subject areas contained within the documents.

The natural language generation platform may be configured to process the human annotations to any of these areas in order to better inform the natural language model how to understand these complex communications. The natural language model can be trained through the iterative process utilizing human annotations to more easily determine how to categorize any of these diverse areas of human communications.

In some embodiments, the various categories or topics, sometimes referred to herein as labels, that the documents are intended to be grouped into may be organized by a hierarchical data structure, referred to herein as an ontology. The hierarchical structure design of the ontology may define a plurality of subcategories, or sub labels, that thematically or topically fit within a larger umbrella label. For example, a set of documents about customer service emails of a telecommunications company may be categorized into an ontology where a first label of the ontology may be simply "customer service." Under this first label, multiple sub labels may be included that thematically fall within the broader label of customer service, such as "Internet," "phone," and "customer service experience." There may be further sub labels, such as "Check the router power," which could be specific responses to questions in the customer service exchange, representing a single intention type of the person emailing the customer service representative: in this example, the intention to get solutions for a broken internet connection. In general, an ontology may include multiple levels of sub labels under higher levels of sub labels, and so forth. Similarly, an ontology may include multiple labels which define a plurality of common subcategories, that thematically or topically fit within each larger umbrella. In its totality, the ontology can represent the multiple label, information extracted, and sequence of responses to questions, for an entire business unit and organization.

In some embodiments, these labels of the ontology may define and provide structure for the categorization of millions of documents by the natural language model. That is, developing the natural language model will include a goal of training the natural language model to accurately classify each of the documents in a set of documents into one or more of the labels in the hierarchical data structure. In some embodiments, a process for generating the natural language model includes a subprocess for first generating this ontology. Once generated, the ontology may be used to guide the aforementioned iterative process of obtaining human annotations and applying them in adaptive machine learning processes to generate a natural language model.

Once tuned to a user's specific needs through the aforementioned iterative process, the natural language model can then be applied to untested human communications, and may generate an output that summarizes which human communications and how many are categorized into the various labels in the ontology structure (e.g., positive sentiment of a politician, negative sentiment of a politician). The process conducted through the natural language model for classifying the thousands or even millions of documents into the specified topics (also referred to herein as labels) may be referred to herein as a document-scope task.

In some embodiments, a natural language model of the present disclosures may also be configured to extract specific subsets of text from documents (e.g., extract every phrase mentioning an anticipated cost or savings in a document discussing tax reform, or extract all words naming the crew in one or more documents relating to the latest blockbuster movie). This process conducted through the natural language model for extracting specific types of text from one or more documents may be referred to herein as a span-scope task. In general, as used herein, a span may refer to a subset of words or characters in a document, such as a paragraph, multiple paragraphs, sentences, or a plurality of words. Performing a span scope task may also include first generating an ontology, and then conducting the iterative human annotation and adaptive machine learning process, in some embodiments.

In some embodiments, a natural language platform of the present disclosures may also be configured to simply identify or discover what categories or subject areas (e.g., labels) the documents may be thematically organized into. For example, it may not be known what are the top twenty subject areas being most discussed in all tweets within the first week of September 2015. Before a natural language model can be generated to summarize what sentiment is being conveyed about these top twenty most discussed subject areas, it should be known what kinds of subject matters these tweets generally discuss in the first place. The process for discovering what topics or subject areas the documents may be thematically organized into may be referred to as topic modeling.

In some embodiments, a natural language platform of the present disclosures may also be configured to utilize rules in combination with the iterative human annotation/machine learning process. In some embodiments, the rules may be imported from an existing body specified by a user or customer. In addition, the natural language model may be generated with the aid of any pre-existing conditions specified by the user, such as specified topics or rules, and embodiments are not so limited.

In some embodiments, a natural language model may be generated using previously generated natural language models that were tailored to different but similar subject areas. In addition, the natural language model may be refined or updated through a maintenance process so that the model may be better suited to handle new data with an evolving body of words. For example, a natural language model for processing tweets may be refined over time to account for new slang or idioms that were not previously used in the common vernacular.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Referring to FIG. 1A, a network diagram illustrating an example network environment 100 suitable for performing aspects of the present disclosure is shown, according to some example embodiments. The example network environment 100 includes a server machine 110, a database 115, a first device 120 for a first user 122, and a second device 130 for a second user 132, all communicatively coupled to each other via a network 190. The server machine 110 may form all or part of a network-based system 105 (e.g., a cloud-based server system configured to provide one or more services to the first and second devices 120 and 130). The server machine 110, the first device 120, and the second device 130 may each be implemented in a computer system, in whole or in part, as described below with respect to FIG. 16. The network-based system 105 may be an example of a natural language platform configured to generate natural language models as described herein. The server machine 110 and the database 115 may be components of the natural language platform configured to perform these functions. While the server machine 110 is represented as just a single machine and the database 115 where is represented as just a single database, in some embodiments, multiple server machines and multiple databases communicatively coupled in parallel or in serial may be utilized, and embodiments are not so limited.

Also shown in FIG. 1A are a first user 122 and a second user 132. One or both of the first and second users 122 and 132 may be a human user, a machine user (e.g., a computer configured by a software program to interact with the first device 120), or any suitable combination thereof (e.g., a human assisted by a machine or a machine supervised by a human). The first user 122 may be associated with the first device 120 and may be a user of the first device 120. For example, the first device 120 may be a desktop computer, a vehicle computer, a tablet computer, a navigational device, a portable media device, a smartphone, or a wearable device (e.g., a smart watch or smart glasses) belonging to the first user 122. Likewise, the second user 132 may be associated with the second device 130. As an example, the second device 130 may be a desktop computer, a vehicle computer, a tablet computer, a navigational device, a portable media device, a smartphone, or a wearable device (e.g., a smart watch or smart glasses) belonging to the second user 132. The first user 122 and a second user 132 may be examples of users or customers interfacing with the network-based system 105 to utilize a natural language model according to their specific needs. In other cases, the users 122 and 132 may be examples of annotators who are supplying annotations to documents to be used for training purposes when developing a natural language model. In other cases, the users 122 and 132 may be examples of analysts who are providing inputs to the natural language platform to more efficiently train the natural language model. The users 122 and 132 may interface with the network-based system 105 through the devices 120 and 130, respectively.

Any of the machines, databases 115, or first or second devices 120 or 130 shown in FIG. 1A may be implemented in a general-purpose computer modified (e.g., configured or programmed) by software (e.g., one or more software modules) to be a special-purpose computer to perform one or more of the functions described herein for that machine, database 115, or first or second device 120 or 130. For example, a computer system able to implement any one or more of the methodologies described herein is discussed below with respect to FIG. 16. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1A may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 1B:
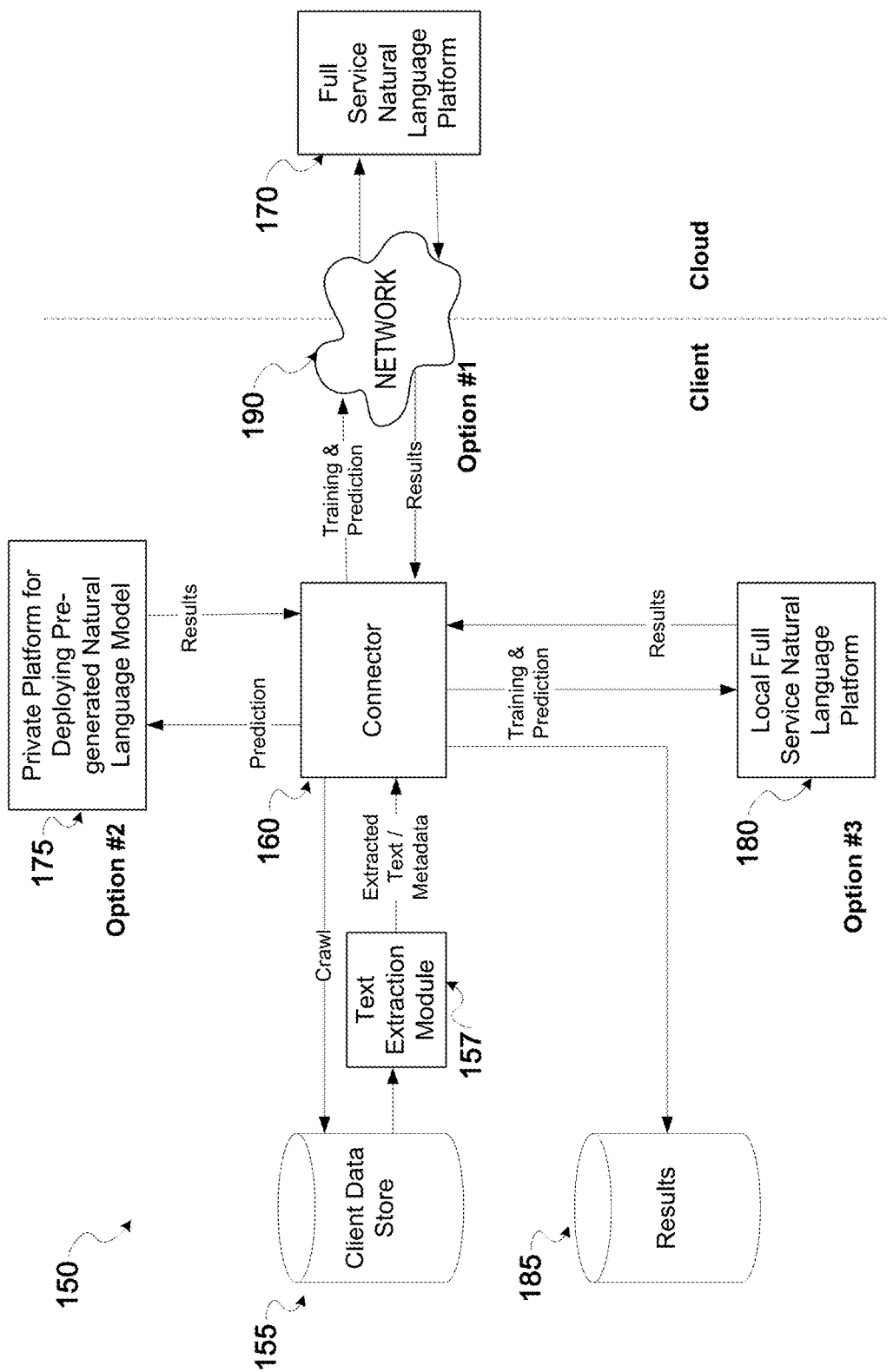
FIG. 1B is diagram providing additional examples of networked environments for generating natural language models, according to some embodiments.

Referring to FIG. 1B, diagram 150 provides additional examples of networked environments for generating natural language models, according to some embodiments. Diagram 150 provides a block diagram view of various configurations of a natural language platform configured to generate natural language models may interact with various data structures of a client, such as a user 120 or 130. In diagram 150, three options are illustrated. According to any of the three options, a flow of data transfer for generating natural language models begins at a client data store 155. The client data store 155 may contain a repository of data that is used to train and ultimately generate the natural language model. In some embodiments, a text extraction module 157 may be installed or communicatively coupled to the client data store 155 and may be configured to extract textual data. For example, the client data store 155 may contain scanned copies of articles or printed text. The text extraction module 157 may be configured to convert the scanned copies into computer readable text. The textual data may be transmitted to a connector 160, which may include software and hardware configured to act as a bridge that interfaces between the client data store 155 and one or more natural language platforms.

According to Option #1, from the connector 160, the textual data may be transmitted to a full-service natural language platform 170 through the network 190. The full-service natural language platform 170 may be located geographically distinct from the client, such as in a cloud environment. The full-service natural language platform 170 may be configured to provide all available services for generating natural language models described herein, the various services of which will be described more fully below. At the least, the full-service natural language platform 170 may be configured to generate a natural language model for the client by training the model on the textual data derived from the client data store 155. As shown, this process may occur in the cloud environment. In addition, the full-service natural language platform 170 may also be configured to apply the trained natural language model on untested, "live" data, referred to herein as providing predictions on the untrained and untested data. The untrained or untested data may also be obtained from the client, such as from the client data store 155. As shown, this process also may occur in the cloud environment. The results of these predictions may be transmitted back to the client, through the network 190, bridged by the connector 160, and ultimately stored in a results repository 185.

According to Option #2, from the connector 160, the textual data may be transmitted to a client-controlled natural language platform 175. The client control platform 175 may be stored locally and within the exclusive control of the client, according to some embodiments. In this option, the client-controlled platform 175 may be configured to deploy a pre-generated natural language model, meaning the natural language model was already trained with previous data. The arrow from the connector 160 to the client-controlled platform 175 lists only "prediction," meaning that the ability to train a natural language model is not available in this option. However, as shown, the client is able to utilize the pre-generated natural language model to make predictions on the untrained and untested data. These results are supplied to the connector 160, and ultimately stored in the results repository 185. According to this option, the client may have exclusive control of the natural language model, and is not required to release its data to an off-site platform in order to utilize any natural language model. Thus, Option #2 allows for greater privacy for the client.

According to Option #3, from the controller 160, the textual data may be transmitted to a client controlled natural language platform 180 and that provides full services. In this option, the full-service natural language platform 170 may be duplicated locally at the client site. This option may be more costly to the client, but may be more comprehensive. The services provided through the cloud 190 at the full-service natural language platform 170 may be substantially identical at the local full-service natural language platform 180, according to some embodiments.

Figure 2A:
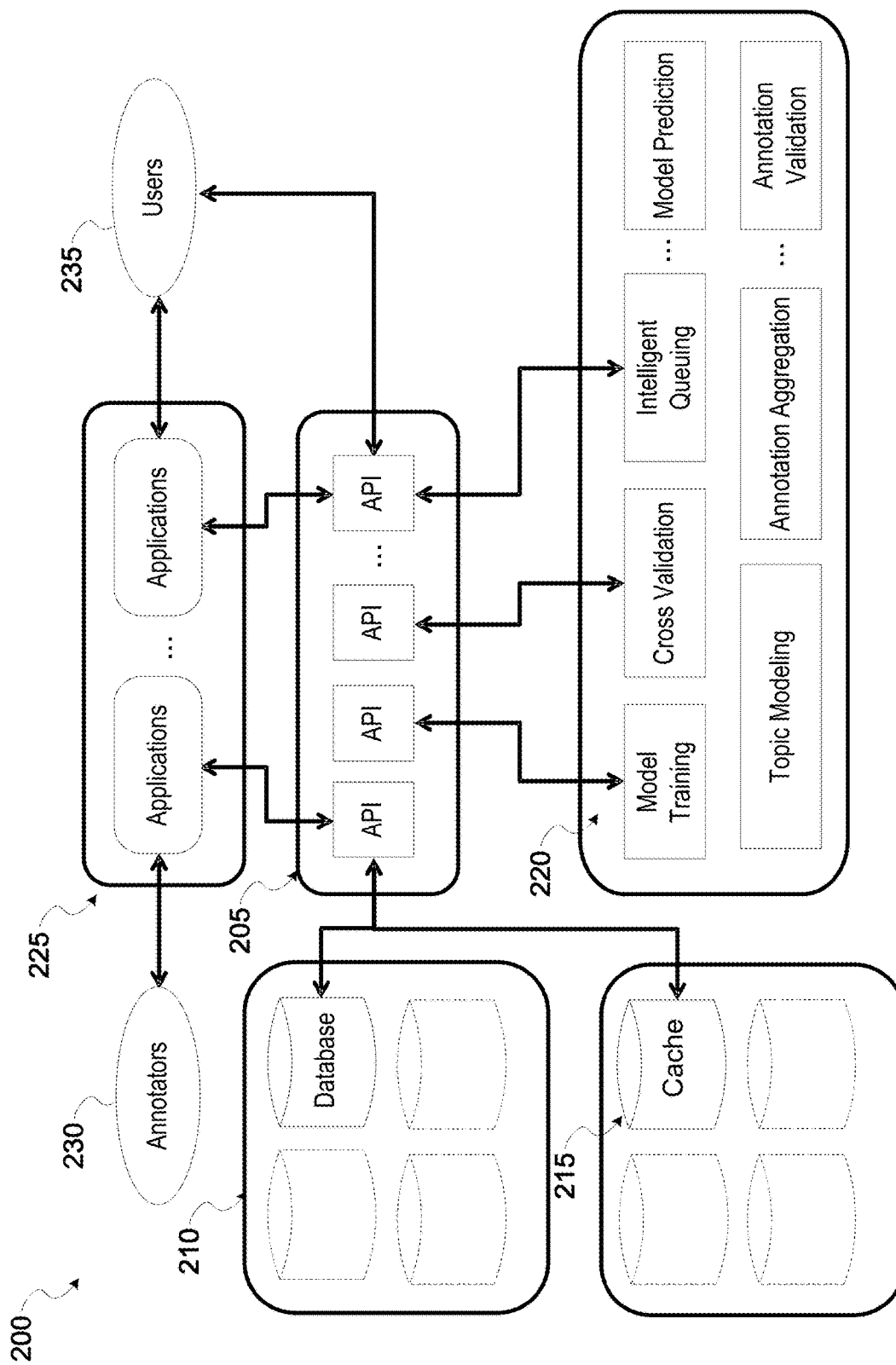
FIG. 2A is a diagram showing an example system architecture for performing aspects of the present disclosure, according to some example embodiments.

Referring to FIG. 2A, a diagram 200 is presented showing an example system architecture for performing aspects of the present disclosure, according to some example embodiments. The example system architecture according to diagram 200 represents various data structures and their interrelationships that may comprise a natural language platform, such as the natural language platform 170, or the network-based system 105. These various data structures may be implemented through a combination of hardware and software, the details of which may be apparent to those with skill in the art based on the descriptions of the various data structures described herein. For example, an API module 205 includes one or more API processors, where multiple API processors may be connected in parallel. In some example embodiments, the repeating boxes in the diagram 200 represent identical servers or machines, to signify that the system architecture in diagram 200 may be scalable to an arbitrary degree. The API module 205 may represent a point of contact for multiple other modules, includes a database module 210, a cache module 215, background processes module 220, applications module 225, and even an interface for users 235 in some example embodiments. The API module 205 may be configured to receive or access data from database module 210. The data may include digital forms of thousands or millions of human communications. The cache module 215 may store in more accessible memory various information from the database module 210 or from users 235 or other subscribers. Because the database module 210 and cache module 215 show accessibility through API module 205, the API module 205 can also support authentication and authorization of the data in these modules. The background module 220 may be configured to perform a number of background processes for aiding natural language processing functionality. Various examples of the background processes include a model training module, a cross validation module, an intelligent queuing module, a model prediction module, a topic modeling module, an annotation aggregation module, an annotation validation module. These various modules are described in more detail below as well as in non-provisional applications Ser. Nos. 14/964,520, 14/964,522, 14/964,510, 14/964,512, 14/964,525, 14/964,528, each of which are again incorporated by reference in their entireties. The API module 205 may also be configured to support display and functionality of one or more applications in applications module 225.

In some example embodiments, the users 235 may access the API module 205, in some cases enabling the users 235 to create their own applications using the system architecture of diagram 200. The users 235 may be other examples of the users 120 or 130, and may also include project managers and analysts. Project managers may utilize the natural language platform to direct the overall construction of one or more natural language models. Analysts may utilize the natural language platform to provide expert analysis and annotations to more efficiently train a natural language model. Also, annotators 230 may have access to applications already created in applications module 225. Further discussion about the annotators is found more below.

In some embodiments, the system architecture according to diagram 200 may be scalable and reproducible at various client sites, in some cases consistent with the descriptions of FIG. 1B. Thus, the database modules 210 and the cache module 215 may be implemented specifically for each client, such that each client does not share memory capacity with another client to ensure better privacy.

Figure 2B:
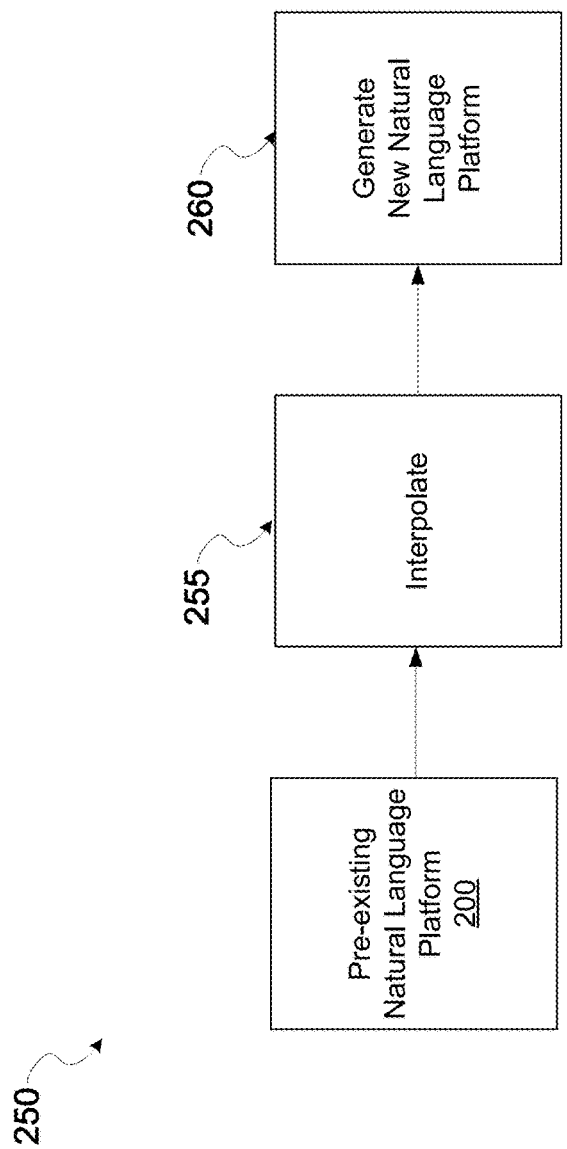
FIG. 2B is a diagram of example flowchart for how the system architecture according to the diagram in FIG. 2A may be utilized to generate other natural language platforms that are more tailored to a client's specific needs, according to some embodiments.

Referring to FIG. 2B, diagram 250 provides an example flowchart for how the system architecture according to diagram 200 may be utilized to generate other natural language platforms that are more tailored to a client's specific needs, according to some embodiments. For example, a pre-existing natural language platform according to the diagram 200 may have already been constructed at the client site. The various API modules 205, database modules 210, cache modules 215, background modules 220, and display modules 225 of the pre-existing natural language platform may have been constructed and tailored to specific client needs and/or specific subject matter areas. For example, the pre-existing natural language platform may have been constructed to generate one or more natural language models related to comments on Twitter about baseball. When generating a new natural language platform for similar subject matter, it may be desirable to start with the pre-existing natural language platform. For example, it may be desirable to base a new natural language platform for a client that desires to process text from Twitter related to all professional sports on the pre-existing natural language platform configured to generate natural language models about baseball.

In this respect, still referring to diagram 250, in some embodiments, an interpolation operation 255 may be applied to the pre-existing natural language platform. The interpolation operation 255 may include copying various modules, data and labels from the pre-existing natural language platform over to the new natural language platform. For example, the various background modules 220 may be calibrated to more efficiently handle text from Twitter, knowing the general size of tweets and having various libraries for understanding contemporary vernacular in tweets. The cache sizes and other various settings in the cache modules 215 may also be attuned to efficiently handle tweets, as another example. The same settings may be applied to the new natural language platform as a starting point. At block 260, the new natural language platform may be generated, and may include various adjustments from the pre-existing natural language platform. As yet another example, the server computation resources assigned to the various background modules 220 may be adjusted in relation to the API modules 205, so that more computation resources are available for intelligent queuing.

In some embodiments, the natural language platform may be implemented by partitioning each of the API modules 205, application modules 225, background processing modules 220, cache modules 215 and database modules 210 to be implemented within individual containers. In such embodiments, platform interpolation may be implemented by adjusting the proportion of processing resources (e.g., memory, network, storage and computation) assigned to each such container. Other components that may be interpolated from pre-existing and analogous platforms may include computational resources (CPU performance, memory) reserved for the background processing modules relative to the API module. If the interpolated system will be used primarily for prediction, rather than for topic modeling or re-training, then a greater share of CPU resources may be allocated to the API module. Another example includes selecting an optimized default text encoding for the language(s) used in the interpolated systems. For example, if the interpolated system will only process Western European characters (no emoji, Cyrillic, or East Asian languages, et al.), then using ISO-8859-1 instead of UTF-8 can improve performance and reduce storage cost.

Figure 3:
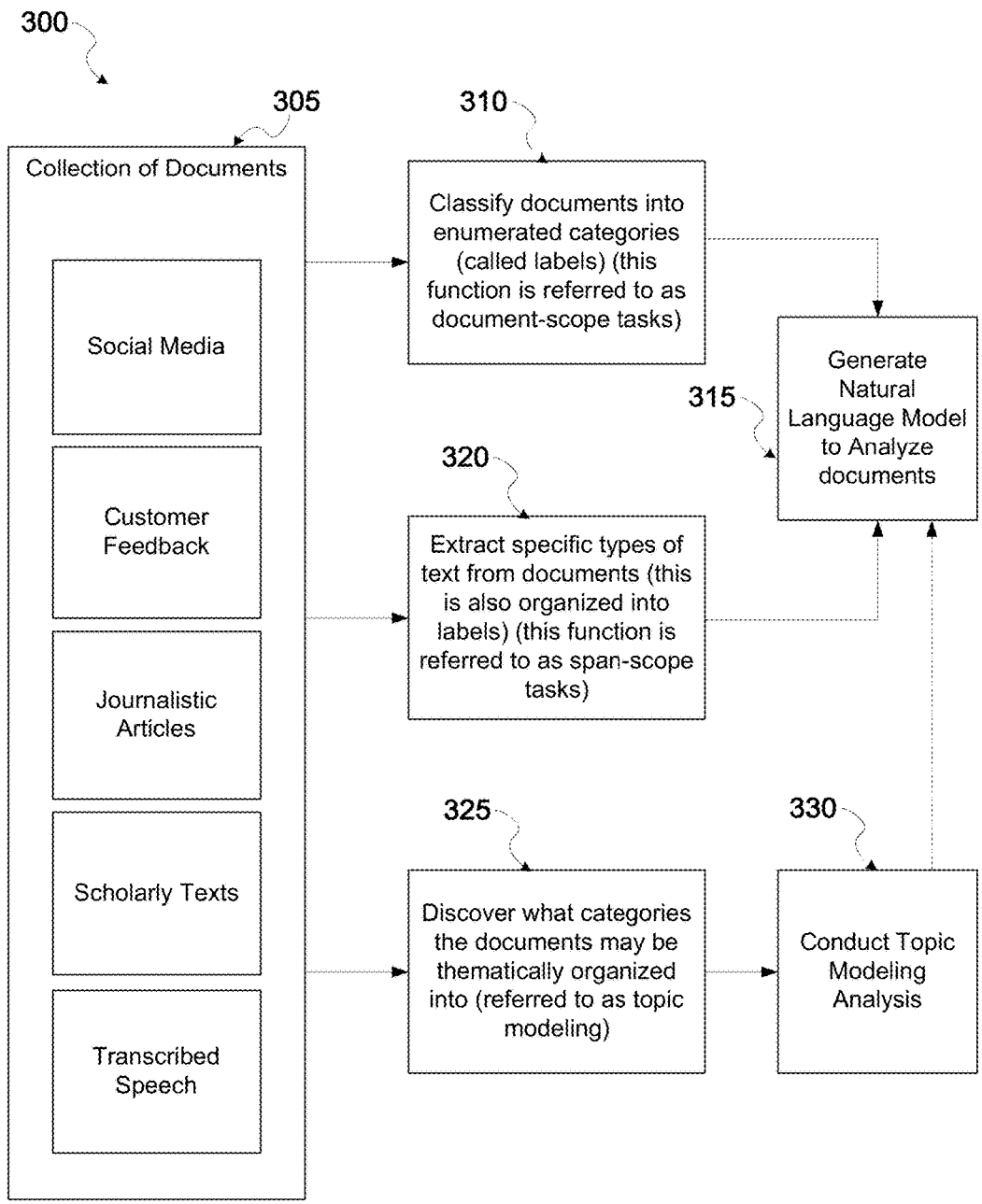
FIG. 3 is a high level diagram showing various examples of types of human communications and what the objectives may be for a natural language model to accomplish, according to some embodiments.

Referring to FIG. 3, a high level diagram 300 is presented showing various examples of types of human communications and what the objectives may be for a natural language model to accomplish. That is, while FIGS. 1A-2B have described the various structures of a natural language platform configured to generate one or more natural language models, FIG. 3 and the following figures will now discuss the various example functional objectives to be accomplished and various example technical processes used to achieve these functional objectives. Here, various sources of data, sometimes referred to as a collection of documents 305, may be obtained and stored in, for example database 115, client data store 155, or database modules 210, and may represent different types of human communications, all capable of being analyzed by a natural language model. Examples of the types of documents 305 include, but are not limited to, posts in social media, emails or other writings for customer feedback, pieces of or whole journalistic articles, commands spoken or written to electronic devices, and pieces of or whole scholarly texts. Other types include transcribed call center recordings, electronic (instant) messages, corporate communications (e.g., SEC 10-k, 10-q), confidential documents and communications stored on internal collaboration systems (e.g., SharePoint, Notes), and questions and answers, either in isolation or as part of longer dialogues.

In some embodiments, at block 310, it may be desired to classify any of the documents 305 into a number of enumerated categories or topics, consistent with some of the descriptions mentioned above. This may be referred to as performing a document-scope task. For example, a user 130 in telecommunications may supply thousands of customer service emails related to services provided by a telecommunications company. The user 130 may desire to have a natural language model generated that classifies the emails into predetermined categories, such as negative sentiment about their Internet service, positive sentiment about their Internet service, negative sentiment about their cable service, and positive sentiment about their cable service. As previously mentioned, these various categories for which a natural language model may classify the emails into, e.g. "negative" sentiment about "Internet service," "positive" sentiment about "Internet service," "negative" sentiment about "cable service," etc., may be referred to as "labels." Based on these objectives, at block 315, a natural language model may be generated that is tailored to classify these types of emails into these types of labels.

As another example, in some embodiments, at block 320, it may be desired to extract specific subsets of text from documents, consistent with some of the descriptions mentioned above. This may be another example of performing a span-scope task, in reference to the fact that this function focuses on a subset within each document (as previously mentioned, referred to herein as a "span"). For example, a user 130 may desire to identify all instances of a keyword, key phrase, or general subject matter within a novel. Certainly, this span scope task may be applied to multiple novels or other documents. Here too, based on this objective, at block 315, a natural language model may be generated that is tailored to perform this function for a specified number of documents.

As another example, in some embodiments, at block 325, it may be desired to discover what categories the documents may be thematically or topically organized into in the first place, consistent with descriptions above about topic modeling. In some cases, the user 130 may utilize the natural language platform only to perform topic modeling and to discover what topics are most discussed in a specified collection of documents 305. To this end, the natural language platform may be configured to conduct topic modeling analysis at block 330. Topic modeling is discussed in more detail below, as well as in application Ser. Nos. 14/964,520, 14/964,522, 14/964,511, each of which are again incorporated herein by reference in their entireties. In some cases, it may be desired to then generate a natural language model that categorizes the documents 305 into these newfound topics. Thus, after performing the topic modeling analysis 230, in some embodiments, the natural language model may also be generated at block 315.

Figure 4:
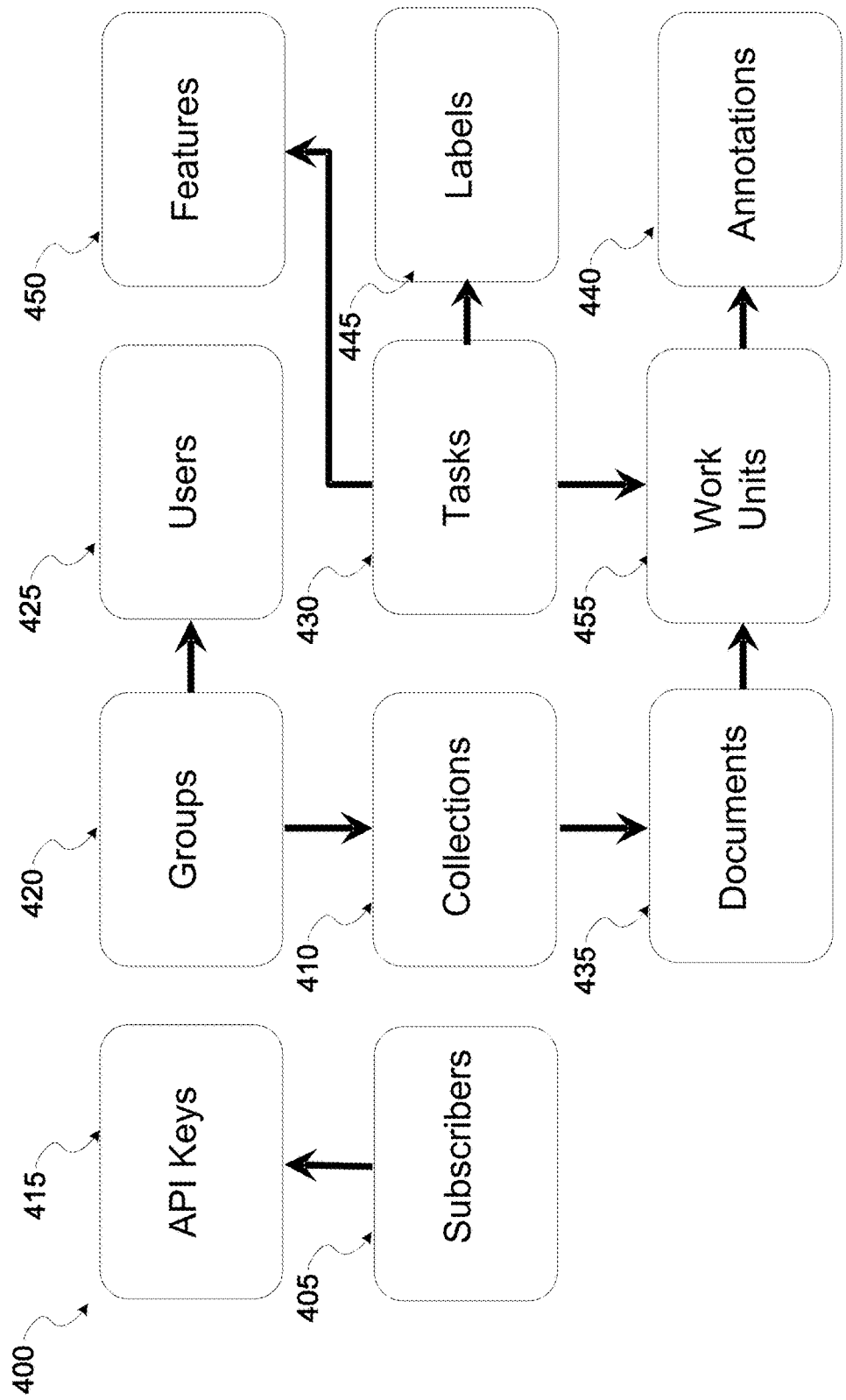
FIG. 4 is a diagram showing an example flowchart for how different data structures within the system architecture may be related to one another, according to some example embodiments.

Referring to FIG. 4, a diagram 400 is presented showing an example flowchart for how different data structures within the system architecture may be related to one another, according to some example embodiments. Here, the collections data structure 410 represents a set of documents 435 that in some cases may generally be homogenous. A document 435 represents a human communication expressed in a single discrete package, such as a single tweet, a webpage, a chapter of a book, a command to a device, or a journal article, or any part thereof. Each collection 410 may have one or more tasks 430 associated with it. A task 430 may be thought of as a classification scheme. For example, a collection 410 of tweets may be classified by its sentiment, e.g. a positive sentiment or a negative sentiment, where each classification constitutes a task 430 about a collection 410. A label 445 refers to a specific prediction about a specific classification. For example, a label 445 may be the "positive sentiment" of a human communication, or the "negative sentiment" of a human communication. In some cases, labels 445 can be applied to merely portions of documents 435, such as paragraphs in an article or particular names or places mentioned in a document 435. For example, a label 445 may be a "positive opinion" expressed about a product mentioned in a human communication, or a "negative opinion" expressed about a product mentioned in a human communication. In some example embodiments, a task may be a sub-task of another task, allowing for a hierarchy or complex network of tasks. For example, if a task has a label of "positive opinion," there might be sub-tasks for types of "positives opinions," like "intention to purchase the product," "positive review," "recommendation to friend," and so on, and there may be subtasks that capture other relevant information, such as "positive features."

Annotations 440 refer to classifications imputed onto a collection 410 or a document 435 by an external source, such as human input, interpolation from an existing natural language model, or application of an external transformation process on the metadata included with the document (e.g., customer value, geographic location, etc.). As an example, an annotation 440 applies a label 445 manually to a document 435. In other cases, annotations 440 are provided by users 235 from pre-existing data. In other cases, annotations 440 may be derived from human critiques of one or more documents 435, where the computer determines what annotation 440 should be placed on a document 435 (or collection 410) based on the human critique. In other cases, with enough data in a language model, annotations 440 of a collection 410 can be derived from one or more patterns of pre-existing annotations found in the collection 410 or a similar collection 410.

In some example embodiments, features 450 refer to a library or collection of certain key words or groups of words that may be used to determine whether a task 430 should be associated with a collection 410 or document 435. Thus, each task 430 has associated with it one or more features 450 that help define the task 430. In some example embodiments, features 450 can also include a length of words or other linguistic descriptions about the language structure of a document 435, in order to define the task 430. For example, classifying a document 435 as being a legal document may be based on determining if the document 435 contains a threshold number of words with particularly long lengths, words belonging to a pre-defined dictionary of legal-terms, or words that are related through syntactic structures and semantic relationships. In some example embodiments, features 450 are defined by code, while in other cases features 450 are discovered by statistical methods. In some example embodiments, features 450 are treated independently, while in other cases features 450 are networked combinations of simpler features that are used in combination utilizing techniques like "deep-learning" or "topic modeling." In some example embodiments, combinations of the methods described herein may be used to define the features 450, and embodiments are not so limited. One or more processors may be used to identify in a document 435 the words found in features data structure 450 to determine what task should be associated with the document 435.

In some example embodiments, a work unit's data structure 455 specifies when humans should be tasked to further examine a document 425. Thus, human annotations may be applied to a document 435 after one or more work units 455 is applied to the document 435. The work units 455 may specify how many human annotators should examine the document 435 and in what order of documents should document 435 be examined. In some example embodiments, work units 455 may also determine what annotations should be reviewed in a particular document 435 and what the optimal user interface should be for review.

In some example embodiments, the data structures 405, 415, 420 and 425 represent data groupings related to user authentication and user access to data in system architecture. For example, the subscribers block 405 may represent users and associated identification information about the users. The subscribers 405 may have associated API keys 415, which may represent one or more authentication data structures used to authenticate subscribers and provide access to the collections 410. Groups 420 may represent a grouping of subscribers based on one or more common traits, such as subscribers 405 belonging to the same company. Individual users 425 capable of accessing the collections 410 may also result from one or more groups 420. In addition, in some cases, each group 420, user 425, or subscriber 405 may have associated with it a more personalized or customized set of collections 510, documents 435, annotations 440, tasks, 430, features 450, and labels 445, based on the specific needs of the customer.

Figure 5:
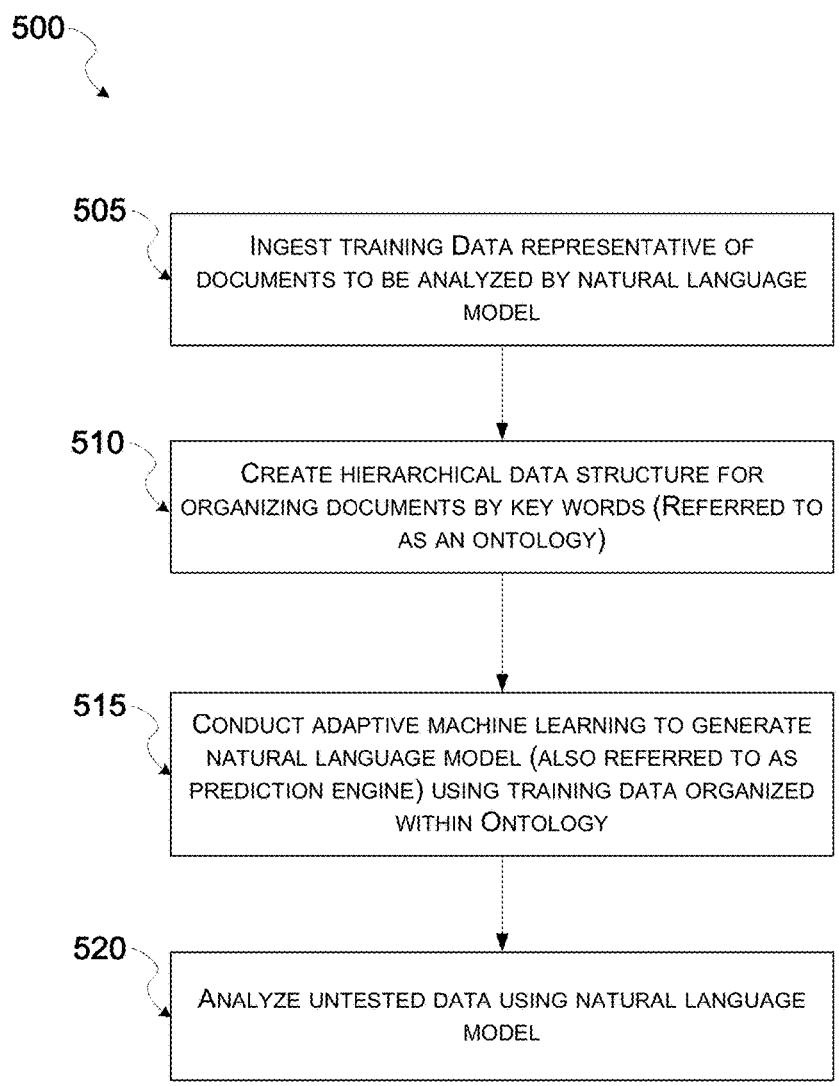
FIG. 5 is a flowchart of a high-level process for generating a natural language model, according to some embodiments.

Referring to FIG. 5, flowchart 500 provides a high-level process for generating a natural language model, according to some embodiments. The high-level process described in FIG. 5 may be implemented by a natural language platform, various examples of which have been described herein. Starting at block 505, a natural language platform may be configured to ingest training data representative of documents that will ultimately be analyzed by the natural language model once the natural language model is fully trained. Examples of training data may include exactly the types of documents that are intended to be analyzed by the natural language model, including any of the example collections of documents 305. In addition, subsets of documents may be used for training data, such as paragraphs, excerpts, chapters, or articles of larger bodies of text. The training data may be obtained from a number of different sources, including for example, from databases controlled by the client like the client data store 155. In other cases, the training data may be obtained from public sources or from data sets used to derive previously trained natural language models. Example processes describing further details of how the natural language platform may be configured to ingest the training data will be described in more detail below.

At block 510, the natural language platform may then be configured to create a hierarchical data structure used to organize the collection of documents in question, according to some embodiments. As previously mentioned, this hierarchical data structure may be referred to as an ontology. The ontology may include one or more labels that the documents are to be categorized into. The one or more labels may be organized into a hierarchical structure, based on a logical relationship between the labels. For example, if one label may be thought of as having a logical subset of one or more additional labels, then the one or more additional labels may be represented as a sub node under the one label. Examples of this hierarchical tree structure will be described in more detail below.

In some embodiments, the ontology may be created based on labels generated or discovered through the topic modeling process mentioned above. For example, if a client desires to generate a natural language model for performing the task of classification analysis of a random collection of tweets generated within the last two weeks of a calendar year, and the client wants to classify the collection of tweets into the top 10 most discussed topics, topic modeling may first be performed on the collection of tweets to discover precisely what these top 10 topics are. These top 10 topics may then be organized in a hierarchical structure of an ontology, and may include some of the topics as sub nodes under other topics, based on a logical or thematic relationship. For example, Christmas may be a very often discussed topic within the last two weeks of the calendar year, and within the general topic of "Christmas," there may be discussed "presents" and "Santa Claus." Thus, the topics (also called labels) of "presents" and "Santa Claus" may be organized in the ontology as sub nodes of the "Christmas" label.

In some embodiments, the ontology may also be created based on direct inputs from the client, such as manual inputs for labels the client knows or intends should be included in the ontology, as well as previously generated ontology's to be imported by the client. In addition, the ontology may be created through an iterative verification process involving receiving annotations from expert annotators or other analysts. Additional details of these variants will be described more below.

At block 515, after an ontology has been established, the natural language platform may be configured to conduct an adaptive machine learning process to generate the natural language model. This adaptive machine learning process may train the natural language model on how to categorize the training data into the various labels as structured in the ontology. In some embodiments, the natural language platform may be configured to conduct an iterative process including generating and receiving human annotations about the documents and then training the model based on these annotations. In some embodiments, the iterative process may be repeated based on a determination of whether the trained model meets various performance criteria. If the performance criteria are not satisfied, in some embodiments, the natural language platform may also be configured to conduct one or more optimization techniques before repeating the process of generating and receiving new human annotations and then training the model based on these annotations. Further details for conducting this adaptive machine learning process are described in more detail below.

At block 520, once the training process is complete and the natural language model has been sufficiently trained (e.g., the trained model satisfies one or more threshold performance criteria), then the natural language model may be utilized by the natural language platform to analyze untested data as specified by the user or client. As referred to in previous figures, such as FIG. 1B, this phase of the process may be referred to as predicting or generating predictions, and the utilization of the natural language model at this stage may be consistent with the discussion of predictions as described in FIG. 1B. An example output for analyzing the untested data using the natural language model may include organizing the documents into the various labels and sub labels as specified in the ontology structure, or tagging individual documents with all relevant labels and sub-labels from the ontology. In some embodiments, various graphics in one or more graphical user interfaces may also be included and may being configured to graphically depict how the documents are organized within the ontology structure. Examples of these displays are described in application Ser. No. 14/964,522, which is again incorporated herein by reference in its entirety.

Figure 6:
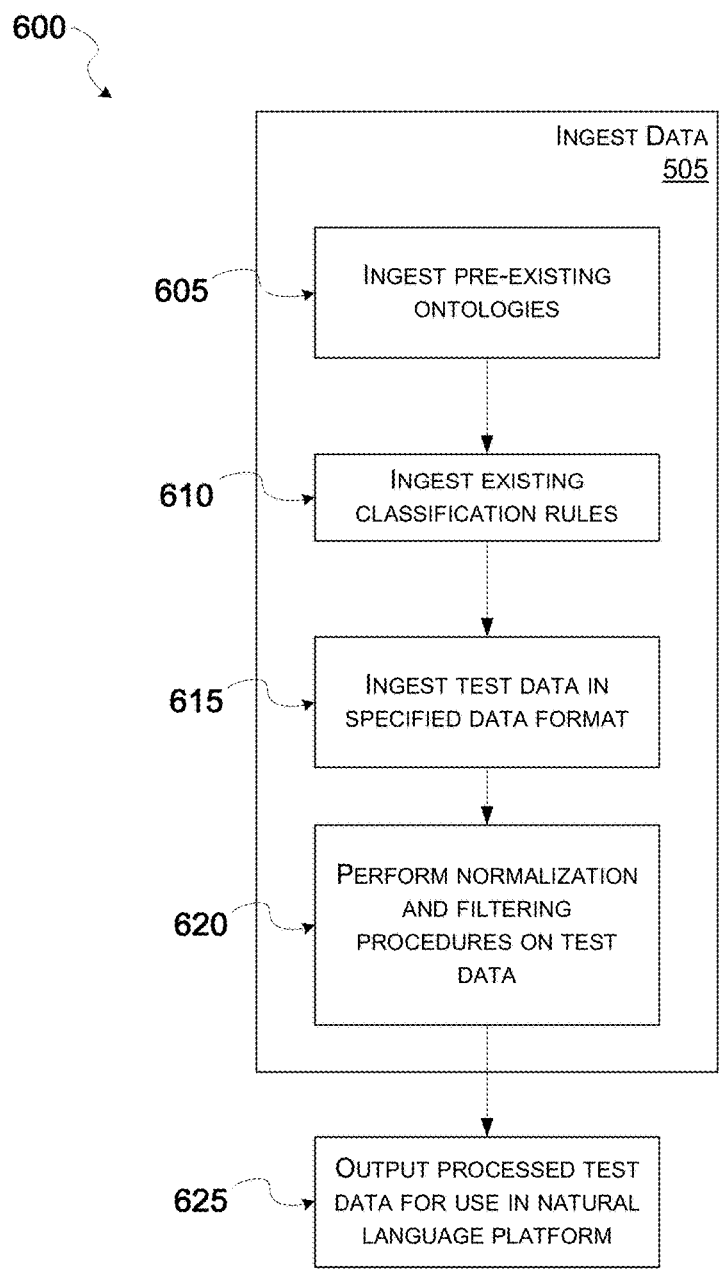
FIG. 6 is a diagram of a more detailed view of the block 505 of FIG. 5, describing the ingest data phase, according to some embodiments.

Referring to FIG. 6, diagram 600 provides a more detailed view of the block 505 of FIG. 5, describing the ingest data phase, according to some embodiments. For example, at block 605, the natural language platform may be configured to ingest data related to one or more pre-existing ontologies. The data of the pre-existing ontologies may be used to help build the ontology for the present natural language model, while in other cases one of the pre-existing ontologies may be used exactly as the intended ontology for the present natural language model. These pre-existing ontologies may be obtained from the user or the client, for example, when the client has already performed some work in building the natural language model previously.

At block 610, the natural language platform may also be configured to ingest existing classification rules for use in training the natural language model, according to some embodiments. As previously mentioned, relying on numerous rules has been a classic way for training natural language models. While aspects of the present disclosure do not rely exclusively on utilizing rules, or even utilizing any rules at all, in some embodiments, the inclusion of at least some rules may still be helpful in training the natural language model. In some cases, the existing classification rules may be obtained from the user or the client, for example, when the client has already performed some work in building the natural language model previously. In some cases, the included rules may represent absolute conditions, such as always classifying a document when the document contains a specific word or phrase. In other cases, the included rules may represent probabilistic conditions that may be weighted against other probabilistic factors. For example, the rule may assign a weight to the document to be classified as a certain label, where said weight may be factored into an overall composite score including other weights based on other factors.

At block 615, the natural language platform may also be configured to ingest test data in a specified data format. An example of ingesting the test data may include the example processes for obtaining data from the client data store 155 in FIG. 1B. Examples of a specified data format may include the test data being converted into all text, or the test data being converted into another uniform format. In some embodiments, the test data may be first ingested in its various formats, and then within the natural language platform, additional processes may convert the data into the uniform format. In other cases, the test data may be first converted into a uniform format, for example, at the client level, which is then ingested by the natural language platform.

At block 620, the natural language platform may also be configured to perform various normalization and filtering procedures on the test data. For example, the documents converted into all text may then be broken up into individual units of language, referred to as tokens. Examples of tokens can include single words, character sequences, punctuation marks, and spaces. As another example, related and semantically-equivalent tokens may be converted into canonical forms. Examples of such canonical normalizations include decomposing character sequencing containing diacriticals (e.g., decomposing "À" to "A" and a combining grave accent) and jamo, expanding abbreviations into the original word (e.g., expanding "Assn." to "Association"), and replacing alternate variations of emoticons with a primary form (e.g., replacing ";-)" or "~_^" with ";)"). Another example includes deduplication of identical, near-identical (retweet/quoted reply), and thematically similar items While the diagram 600 shows arrows progressing from one block to another, in some cases each of the individual blocks 605, 610, 615, and 620 may be performed in different orders, and in some cases not all of the example blocks 605, 610, 615, and 620 need be performed. In general, it may be apparent to those with skill in the art other processes for ingesting data to be used in generating a natural language model, and embodiments are not so limited.

After the various types of data have been ingested at block 505, e.g., any or all of the example blocks 605, 610, 615, and 620 are performed, at block 625, the totality of the ingested data may be processed for use in the natural language platform for generating one or more ontologies and for conducting the adaptive machine learning process to generate one or more natural language models.

Figure 7:
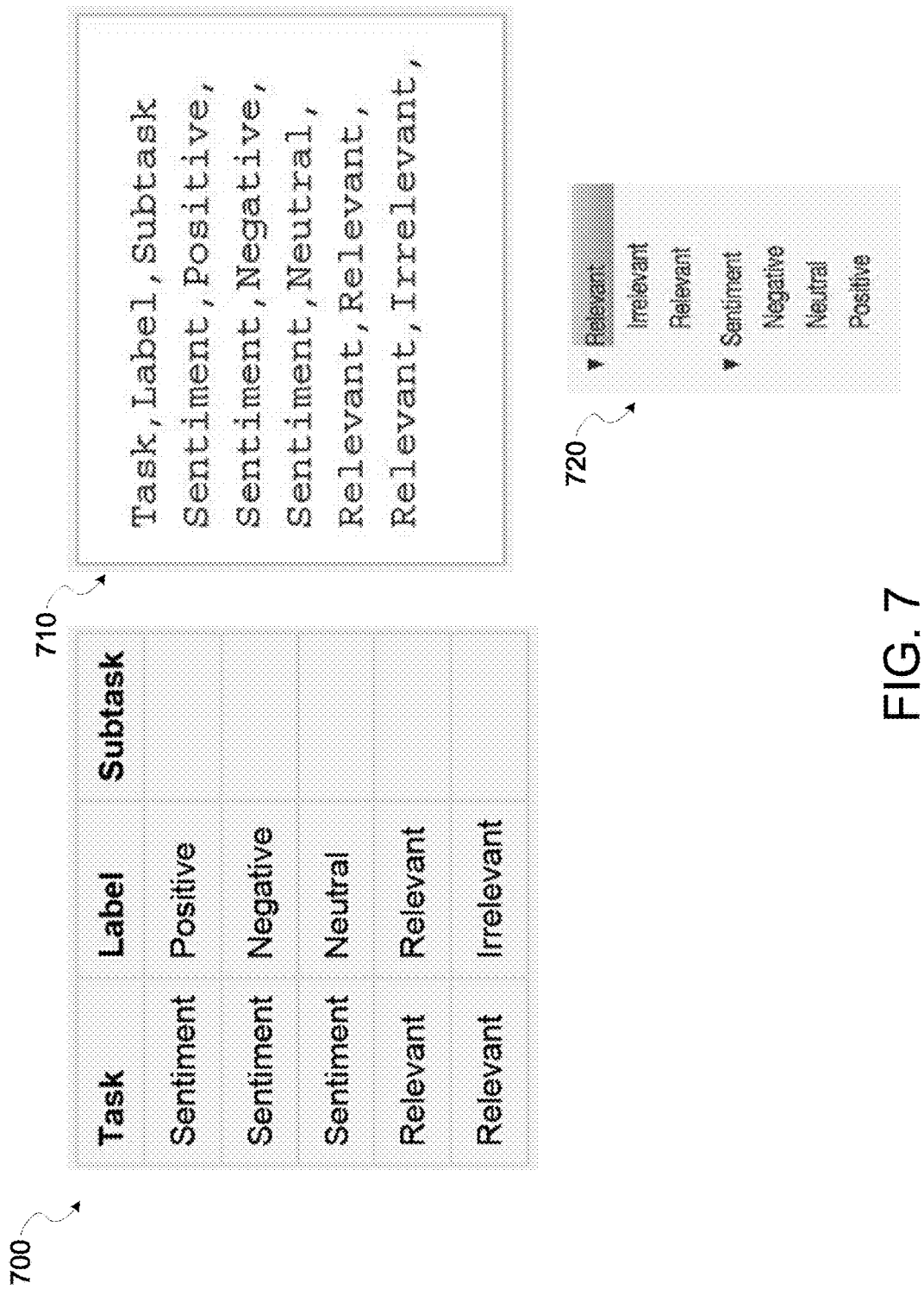
FIG. 7 shows a simple example of an ontology.

Having described example details of block 505 for ingesting data, the next FIGS. 7-10 describe further details of block 510, related to describing example details of various ontologies and an example detailed process for creating the ontology, according to some embodiments. Referring to FIG. 7, a simple example of an ontology is shown through the various charts 700, 710, and 720.

Chart 700 shows a spreadsheet of two tasks, with each task including multiple labels. For example, a "sentiment" task includes three labels, "positive," "negative," and "neutral." As an example, a user may desire to utilize a natural language model to perform a task of classifying documents by the sentiment each document conveys. The various types of sentiment that the documents may be categorized into are enumerated by the labels under this sentiment task, i.e., "positive," "negative," and "neutral." The set of documents may be a collection of tweets about a basketball game, for example. The views expressed in the tweets may therefore be classified as either having positive sentiment, negative sentiment, or neutral sentiment, and the user or client may desire to have a natural language model generated to evaluate these tweets and classify them into one of these various labels.

In another example, still referring to chart 700, a "relevant" task includes two labels, "relevant," and "irrelevant." Here, the user may desire to utilize a natural language model to perform a task of classifying documents according to their relevance, where the determination of relevance may be specified by the user or associated analysts or annotators. For example, the determination of relevance may be based on whether a tweet among the collection of tweets pertains to the basketball game. The collection of tweets may have been obtained over the approximate period of time that the basketball games played, but since other events may be occurring at that time, it may not be a guarantee that all of the tweets necessarily discuss the basketball game. Thus, the natural language model may be configured to evaluate these tweets and classify them as either relevant or irrelevant, according to the criteria used to train the model.

Still referring to chart 700, a column for "subtasks" is shown, which may represent connections between one task to another. Examples of subtasks will be discussed in the later figures. All told, these relationships according to the chart 700 comprise an example of a simple ontology. That is, a natural language model may perform the sentiment task and/or the relevant task to classify a collection of documents (or spans). The natural language model may perform these tasks by evaluating each document among the set of documents and classifying them into one or more of the labels under each task.

Referring to chart 710, the text of the chart 700 is expressed in a textual format. This example format may represent how the natural language model is configured to ingest the ontology so as to perform the proper analysis.

Referring to chart 720, the example ontology formed by the words in chart 700 are shown here being organized in a hierarchical tree structure. That is, the overarching tasks, i.e., "relevant," and "sentiment," may represent the main nodes of the hierarchical structure, as shown. The labels associated with the respective tasks, i.e., "positive," "negative," and "neutral" for the "sentiment" task, and "irrelevant" and "relevant" for the "relevant" task, are placed under their respective tasks as sub nodes.

Figure 8:
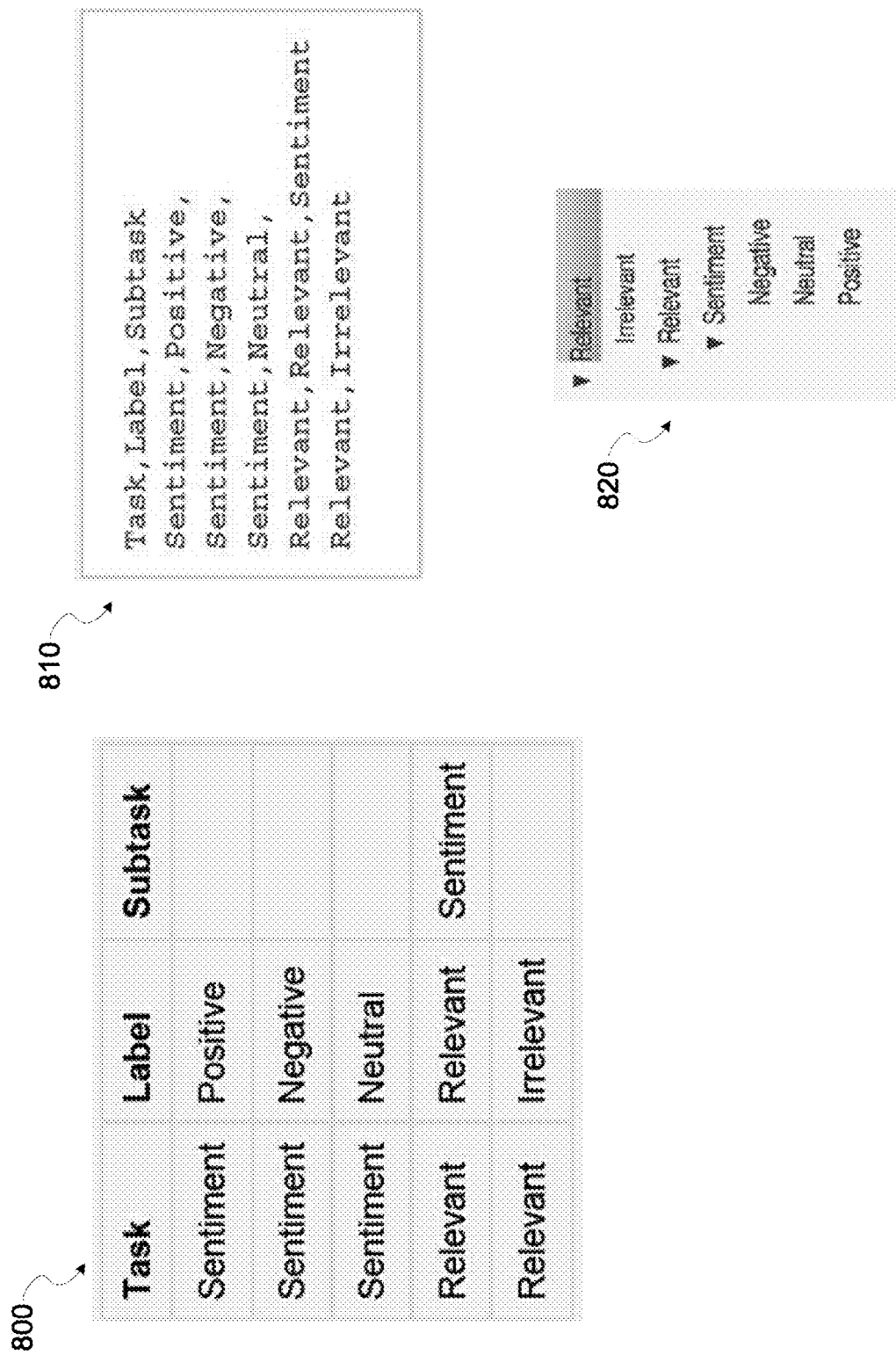
FIG. 8 shows a more complex example of an ontology.

Referring to FIG. 8, a more complex example of an ontology is described. In chart 800, the same tasks and associated labels for each task as in FIG. 7 are shown. In addition, a subtask of "sentiment" is listed and is associated with the label "relevant" under the task "relevant." What this means, according to some embodiments, is that the task of "sentiment" and associated labels are to be embedded as sub nodes under the label "relevant."

Referring to chart 810, the text of the chart 800 is expressed in a textual format. This example format may represent may be how the natural language model is configured to ingest the ontology so as to perform the proper analysis. Notice how the third word "sentiment" is placed after the label "relevant" and a delimiter (e.g., a comma). The natural language platform may be configured to understand that the third word or phrase (e.g., words or phrases after a second delimiter the same line) represent a subtask, based on the organization defined in the first line of chart 810.

Referring to chart 820, the example ontology formed by the words in chart 800 is expressed in a hierarchical tree structure according to the organization defined by the headers in chart 800. That is, because the task "sentiment" is listed as a subtask associated with the label "relevant," the "sentiment" task and associated labels are placed as sub nodes under the "relevant" label, which in itself is a sub node of the "relevant" task, as shown. In this way, when the natural language model analyzes various documents (or spans of documents) according to the structure of this ontology, the natural language model will perform the sentiment analysis task only if the document has first been classified as being "relevant" when performing the "relevant" analysis task. Put another way, if the natural language model analyzes a document (or a span) and determines that the document or span is to be classified as "irrelevant," then the natural language model will discontinue any further analysis of the document or span, since the "irrelevant" label has no further sub nodes to travel down. In general, this example illustrates that the tree structure of the ontology can be used to guide the varying levels of analysis that a natural language model is to perform when analyzing documents.

Figure 9A:
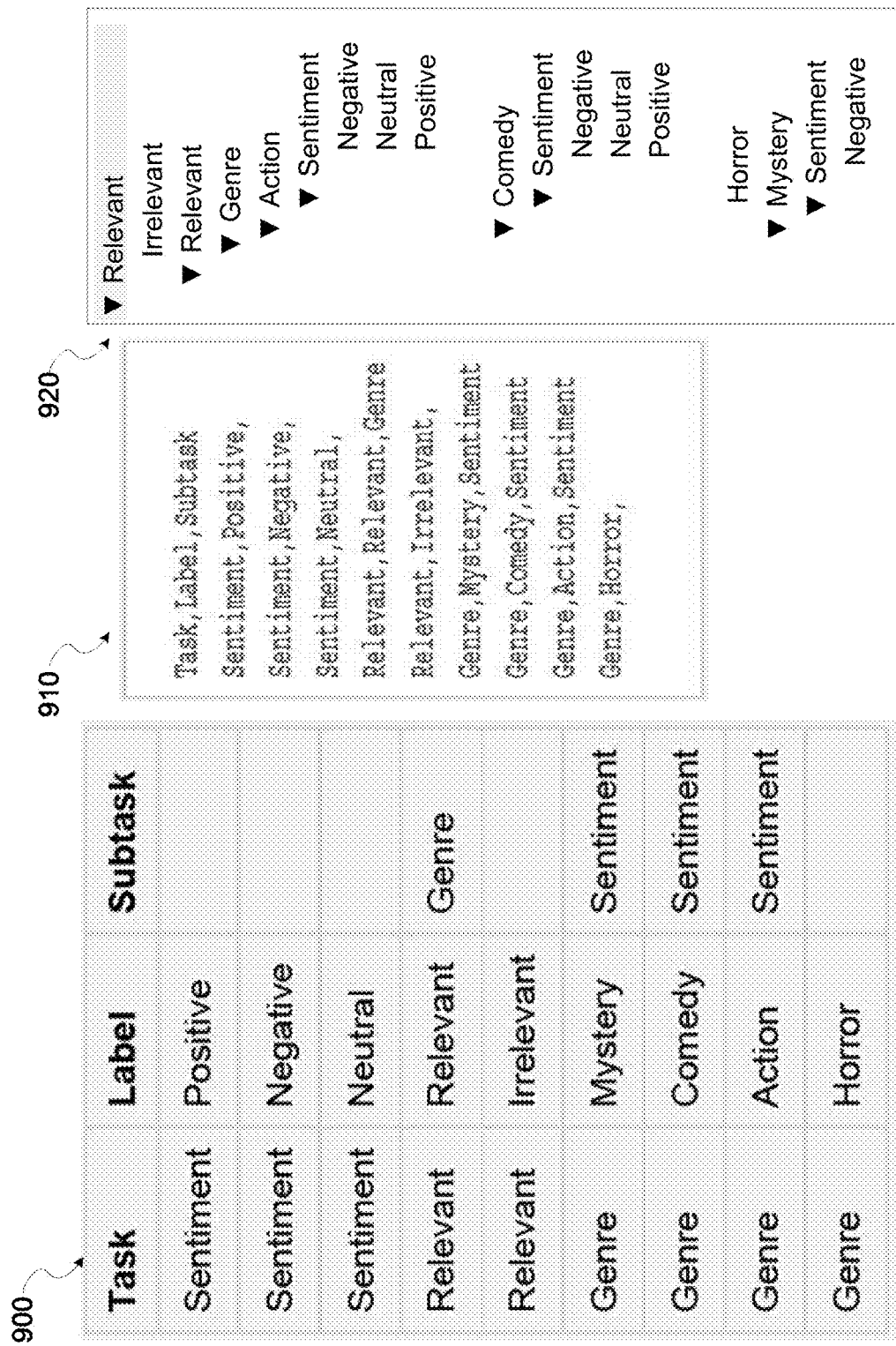
FIGS. 9A and 9B show an even more complex example of an ontology.
Figure 9B:
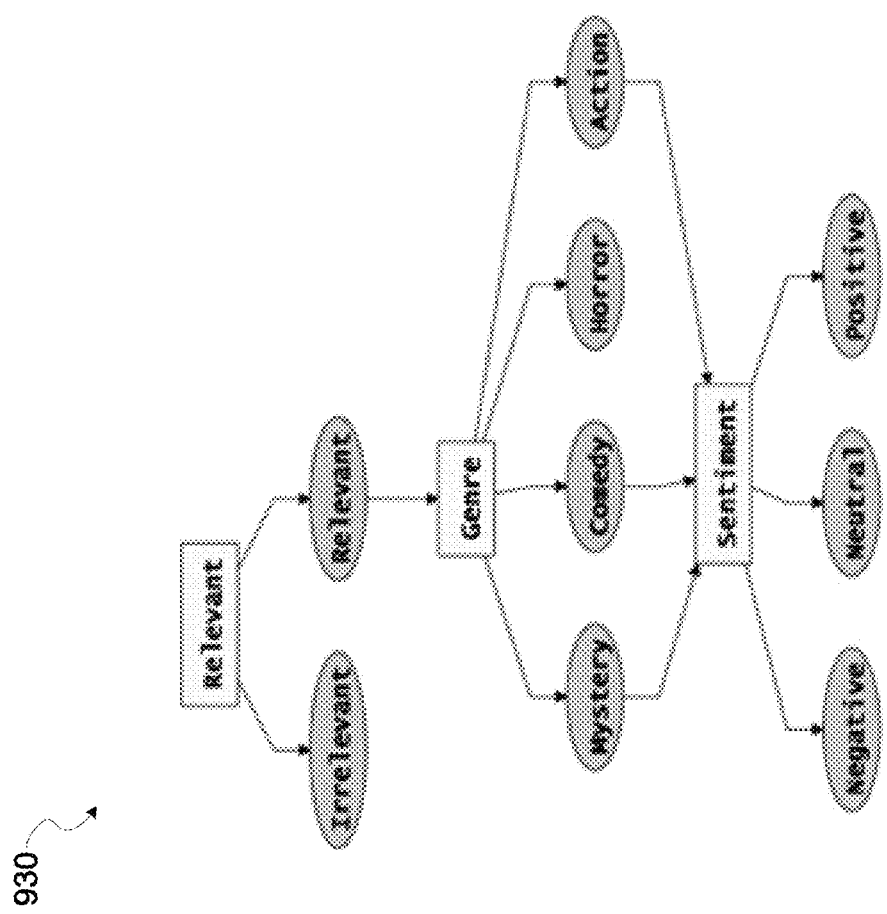

Referring to FIGS. 9A and 9B, an even more complex example of an ontology is shown. Referring to chart 900, an additional task called "genre" is included in the ontology. The genre task is listed as a subtask under the "relevant" label. The genre task includes four labels, "mystery," "comedy," "action," and "horror." Also, the mystery, comedy, and action labels have "sentiment" as a subtask, while the horror label has no subtask listed. This example shows that a single task may be listed as a subtask under multiple labels, and that tasks can be listed as sub tasks in a cascading or hierarchical fashion (e.g., "sentiment" is a subtask of multiple labels in the "genre" task, which is itself a subtask of the "relevant" label of the "relevant" task).

Referring to chart 910, the text of the chart 900 is expressed in a textual format. This example format may represent may be how the natural language model is configured to ingest the ontology so as to perform the proper analysis.

Referring to chart 920, the example ontology formed by the words in chart 900 is expressed in a hierarchical tree structure according to the organization defined by the headers in chart 900. As shown, because the sentiment task is listed as a subtask for three of the labels in the genre task, the sentiment task and its associated labels are embedded as sub nodes under each of the three labels under the genre tasks, i.e., the "action," "comedy," and "mystery" labels. In addition, it can be seen that the entire genre task and associated labels (and subsequent subtasks) is embedded as a sub node under the relevant label, consistent with the organization described in chart 900.

Still referring to chart 920, a natural language model may conduct analysis of documents or spans of documents according to the hierarchical structure as shown. Following the hierarchical structure of the ontology, a natural language model may start by conducting "relevant" analysis of the document or span to determine if the document is "relevant" or "irrelevant." If it is determined that the document is irrelevant, then the analysis ends. However, if the document is determined to be relevant, then the natural language model may proceed by conducting "genre" analysis, to determine whether the document should be classified as fitting into the "action" genre, the "comedy" genre, the "horror" genre, or the "mystery" genre. If classified as fitting into the horror genre, the analysis ends. However, if classified as any of the other three labels, the natural language model may continue by performing "sentiment" analysis, and classifying the document by its sentiment according to the sentiment labels "negative," "neutral," or "positive."

Referring to chart 930 in FIG. 9B, the example ontology described herein is shown in a logical hierarchy format. Various tasks in the ontology are shown in rectangular boxes, while the labels are shown in ovals. The arrows show the progressive relationship for how a natural language model may proceed through the ontology when analyzing a document. Thus, the first level analysis performed is to analyze relevance. If deemed relevant, the next level of analysis performed is genre analysis. If the document is deemed to be categorized into one of the three labels other than "horror," then sentiment analysis is performed last. This logical structure also illustrates how some ontologies may be structured in more complicated ways that a simple tree structure, as the analysis paths after "Mystery," "Comedy" and "Action" all converge to continue performing sentiment analysis.

Figure 10A:
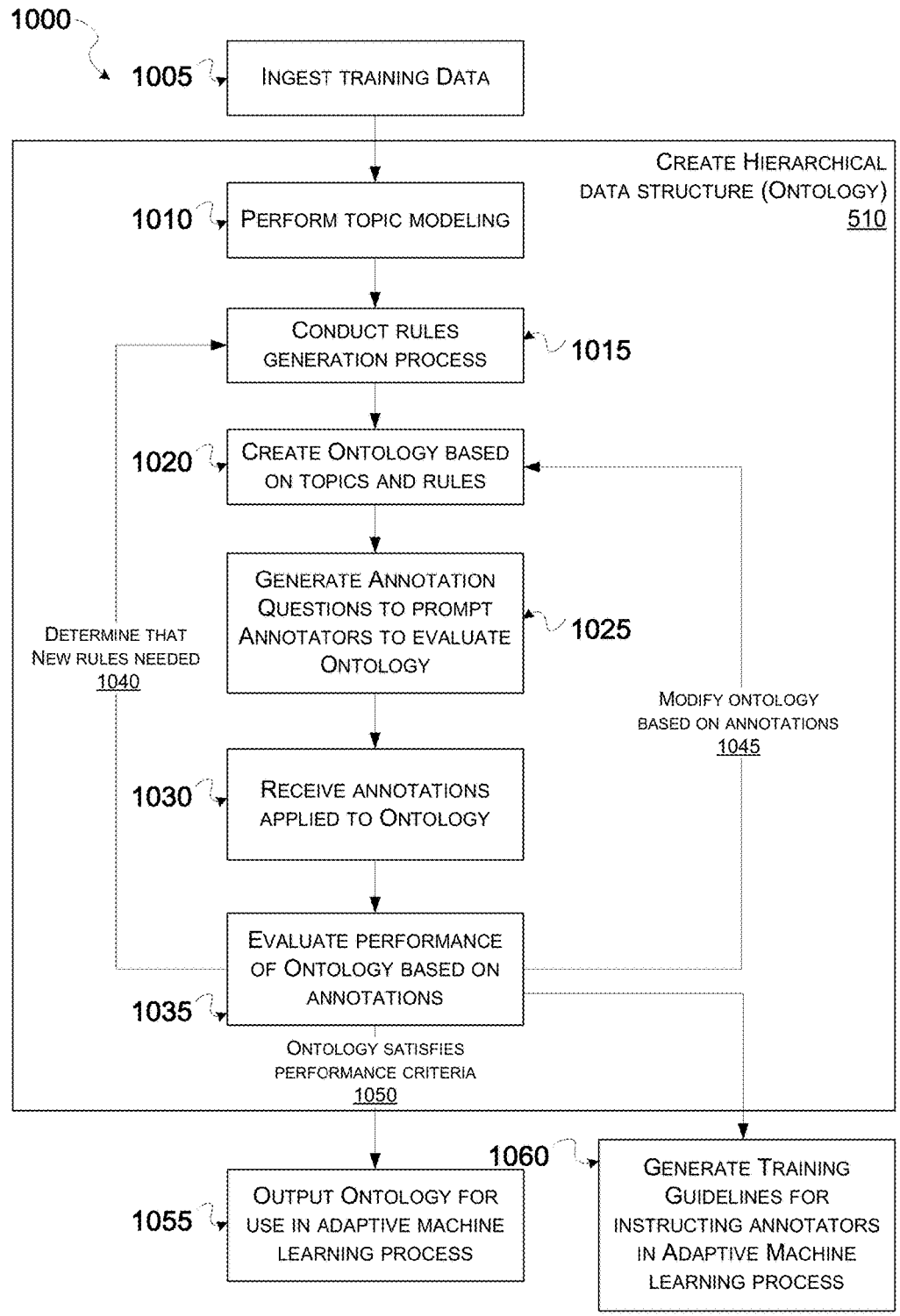
FIGS. 10A-10C provide additional example details for generating the ontology within the block 510 of FIG. 5, according to some embodiments.

Now that examples of ontologies and their applications have been described, referring to FIG. 10A, flowchart 1000 provides additional example details for generating the ontology, according to some embodiments. The example processes of flowchart 1000 may represent further details in block 510 of the high level flow chart of FIG. 5 for generating natural language models. These example sub processes may begin at block 1005, which refers to ingesting training data and other types of data. Block 1005 may be consistent with block 505 and the related details described in flowchart 600 of FIG. 6, where the example outputs at block 625 may serve as the example inputs into flowchart 1000. Again, this data may include a collection of documents or spans of documents, one or more rules, and/or one or more pre-generated ontologies as defined by the client or user.

Having at least obtained a collection of documents intended for a natural language model to analyze, in some embodiments, the natural language platform may be configured to first perform a topic modeling process, at block 1010. This topic modeling process may be consistent with those descriptions of topic modeling described above, as well as examples for performing topic modeling as described in application Ser. Nos. 14/964,520, 14/964,522, 14/964,510, 14/964,512, 14/964,525, 14/964,528 again incorporated herein by reference. The topic modeling process may be used to determine one or more labels for the natural language model to categorize the collection of documents into, and of which may be organized into a hierarchical structure according to the following processes described below. In some embodiments, topic modeling may not be performed, and instead the natural language platform may access pre-generated or predetermined sets of topics as defined by the client or user or previously obtained in the ingest data phase.

At block 1015, the natural language platform may be configured to conduct a rules generation process to confirm and refine rules that may help define how the ontology is to be structured. For example, the natural language platform may access a number of rules, where some may be obtained from the previously ingested data, while other rules may be programmed or otherwise specified by human analysts with expert knowledge of the subject matter for which the natural language model is to be generated for. The natural language platform may receive these inputs about new rules or modifying pre-existing rules from the analysts through one or more graphical user interfaces, such as through the one or more application modules 225 as described in FIG. 2A. The rules generation process at block 1015 may then include verifying the enumerated rules for logical consistencies. For example, the natural language platform may be configured to evaluate the totality of rules to see if any of the rules lead to infinite circular loops, or lead to definitions of labels or tasks that lack proper node connections sufficient to fit in the ontology. As another example, the rules may be evaluated to determine if two or more of the rules conflict with each other, or if two or more of the rules are redundant.

At block 1020, the natural language platform may be configured to generate a first version of the ontology based on the topics discovered or previously obtained and the verified rules in the previous steps. For example, the topics may define the content of the nodes for an ontology, while the rules define the relationships among the various topics. For example, a rule may specify to perform a genre analysis task of a document after determining whether the document is determined to be relevant. Thus, this rule may help define that the genre task should be a sub node under the relevant task. An example process for how rules contribute to generating an ontology includes the following steps:

Given a goal of performing Genre analysis, over a collection of documents discussing movies, an analyst may:

Use topic modeling to automatically identify relationships and clusters between documents;

Manually review the topics, recognizing that several of the identified topics are discussing Horror movies. There may be multiple topics related to Horror movies, e.g., a topic about the Halloween series of films, identified by keywords Halloween, Myers, Curtis, Knife, and a topic about the Nightmare on Elm Street series, identified by keywords Nightmare, Krueger, Craven, and Dreams;

Manually create a classification (label) for Horror within the Genre task; and

Manually define rules that cause documents which include the words "Halloween" or "Nightmare" to be classified as Horror with greater confidence.

In some embodiments, it is possible to create an ontology without topic modeling or rule-writing, by creating a classification scheme and annotating it. This can be sufficient if the classification problem is well-defined and annotations can be crowd-sourced effectively. Sentiment analysis is an example of this.

After applying all of the rules to the various topics to create a hierarchical structure for the ontology, at block 1025, the natural language platform may be configured to test the effectiveness of the ontology, by first generating one or more annotation questions designed to prompt one or more annotators to evaluate the ontology. For example, an annotator might be asked "is there positive sentiment expressed about the car in this sentence?" or "is this statement an acceptable answer to this question?" These annotation prompts may be displayed in the one or more graphical user interfaces, such as through the application modules 225. In some embodiments, analysts may interact with these annotation prompts at the client site, while in other cases the analysts may be stationed locally near the natural language platform.

Figure 10B:
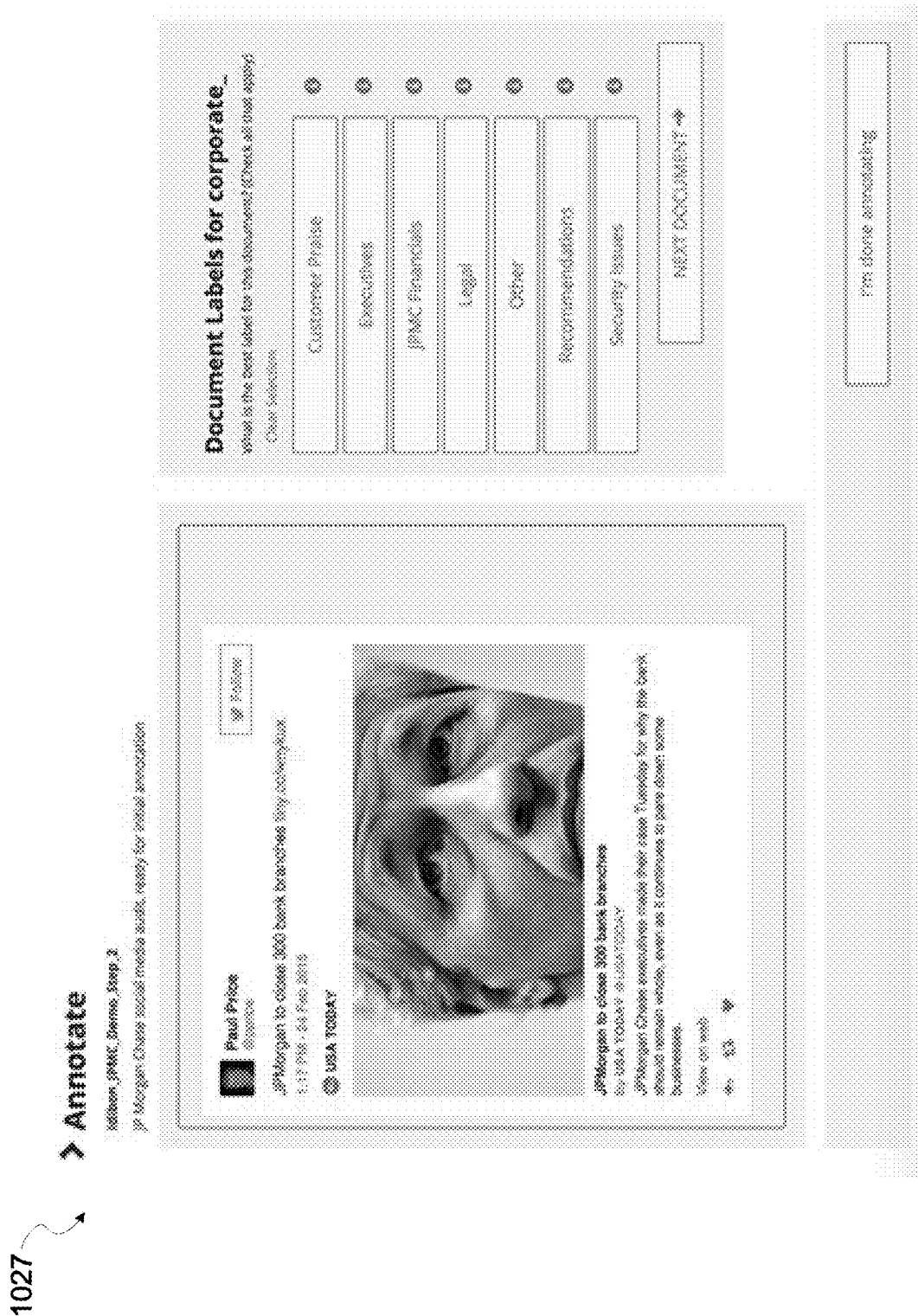

Referring to FIG. 10B, illustration 1027 shows an example annotation interface to collect input in the form of document annotations/classifications from human analysts and other experts, according to some embodiments. These annotations can be used to evaluate the effectiveness of the ontology and to train the natural language processing models. The panel on the left includes a sample document, while the panel on the right includes an annotation prompt and a series of labels in the ontology that the human analyst may select to specify under which label(s) the document belongs to.

Referring back to FIG. 10A now, at block 1030, the natural language platform may be configured to receive the various annotations entered by the human analysts, such as those inputs provided at the example interface in FIG. 10B. These annotations may provide a form of feedback to rate the quality of the ontology structure.

At block 1035, the natural language platform may be configured to evaluate the performance or effectiveness of the ontology based on the received annotations. Evaluation metrics may include the label distribution (how frequently does the annotator select each label) and the proportion of annotated documents are not assigned any label.

Figure 10C:
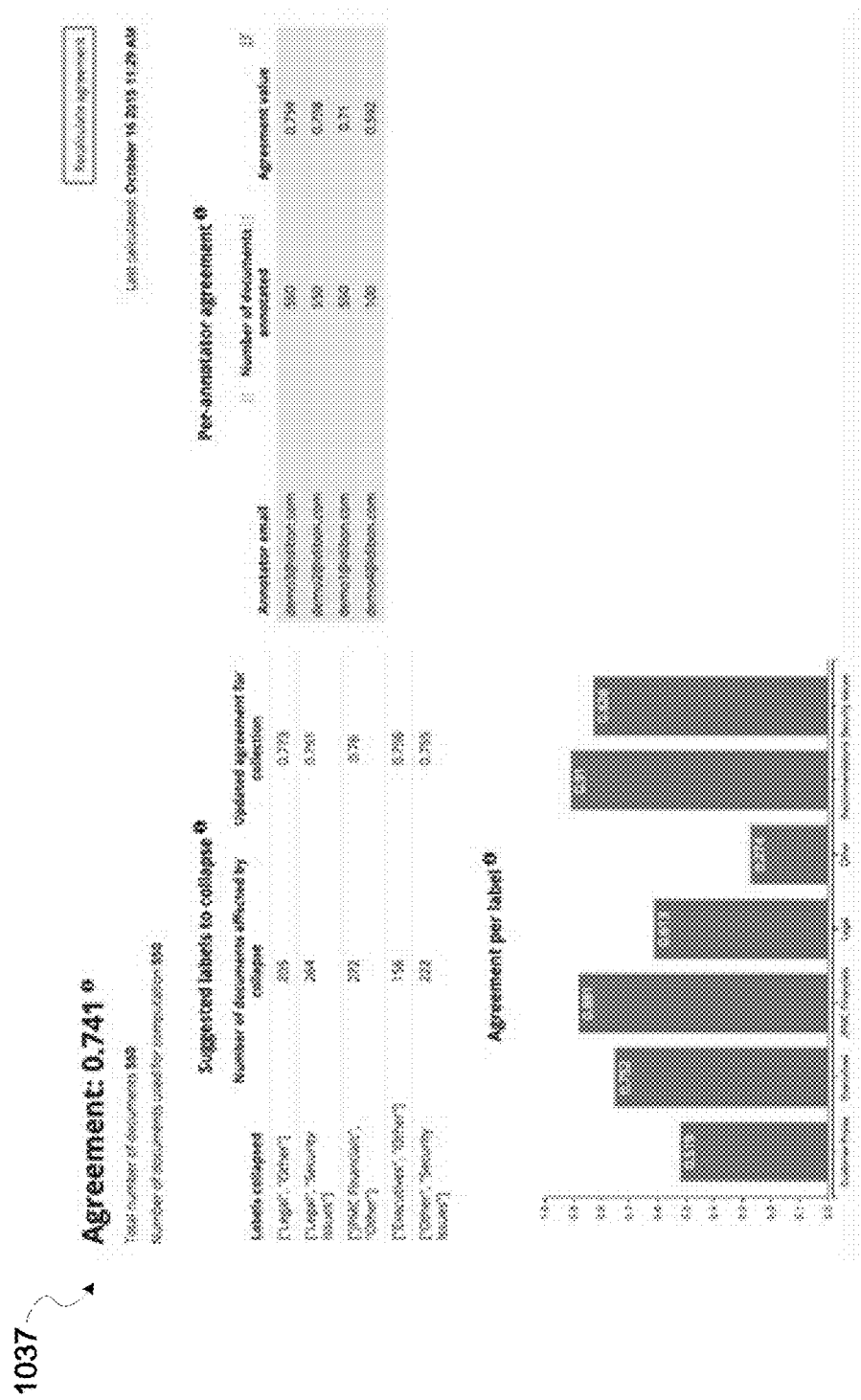

Referring to FIG. 10C, illustration 1037 shows a sample annotation interface to collect input in the form of document annotations/classifications from human experts, according to some embodiments. These annotations can be used to evaluate the effectiveness of the ontology and to train the natural language processing models.

Referring back to FIG. 10A now, in some embodiments, the ontology generation process within block 510 may involve refining the ontology through a series of iterations. For example, it may be determined at block 1035 that the ontology in its current form does not satisfy certain performance criteria. Again, these evaluations may be based on the feedback supplied by the annotations. To improve the ontology content and structure, at step 1040, it may be determined that new rules should be generated or that existing rules may need to be modified. Thus, the ontology creation process may cycle back to block 1015. From here, the natural language platform may facilitate generation of new rules or modification of existing rules through the graphical user interface, so as to receive inputs from analysts to modify the rules. The rules generation process may again verify the veracity of the totality of rules to make sure that there is logical consistency. The process may then proceed to block 1020, then to block 1025, and so on to generate a refined ontology in a second iteration.

In other cases, it may be determined that modifying the rules may not be necessary as the accuracy is already at a level acceptable to the system user, but at the least, that the ontology may still be improved based on the annotations provided previously. Thus, at step 1045, the natural language platform may cycle back to block 1020 and may refine the ontology by incorporating the feedback from the annotations. Similar to step 1040, the ontology creation process may then proceed to block 1025, then to block 1030, and so on in a second or later iteration.

The iterative process for continually refining the ontology between steps 1040 and steps 1045 may continue a number of times until the evaluation of the ontology at block 1035 satisfies one or more performance criteria like inter-annotator agreement, using a metric derived from Krippendorf's Alpha. If it is determined that the performance criteria is satisfied at step 1050, then at block 1055, the ontology may be considered complete enough and may be used in the next step of the natural language model generation process, which is the adaptive machine learning process at block 515.

In some embodiments, at block 1060, during the evaluation phase of the ontology creation, analysts may evaluate the data and determined that certain clarifications may be needed to distinguish among various labels or tasks within the ontology. That is, part of the ontology refinement process may include trying to disambiguate two or more topics from each other, because the topics may be very closely related or potentially confusing. For example, when trying to classify news articles about a financial crisis, the label of "legal" articles may be potentially confusing or overlapping in some ways with the label of "security fraud." While there may be a number of ways to distinguish between these two labels, the analysts may provide and the natural language platform may be configured to receive manual inputs to specify particularly how it is desired for these two topics to be distinguished. In order to do this, analysts may help generate training guidelines that may be used for instructing annotators in the adaptive machine learning process phase. These training guidelines may be expressed as human readable instructions that help define what the different labels mean, and/or how to choose among two or more labels when it is possible for a document to be classified into the two or more labels. For example, to distinguish between "legal" and "security fraud," a training guideline may instruct the annotator to always classify the document as "security fraud" if it appears the document may fall under both categories. In other cases, the training guideline may attempt to provide definitions to help determine what constitutes "security fraud" compared to "legal" generally. In some embodiments, these training guidelines may be displayed to the annotators in one or more of the graphical user interfaces. An example of these training guidelines as described more in application Ser. No. 14/964,522, which again is incorporated herein by reference.

Having now described an example of a more detailed process for creating the ontology (see block 510 of FIG. 5), FIGS. 11A-13 will focus on more detailed examples of generating the natural language model through the adaptive machine learning process (see block 515 of FIG. 5), according to some embodiments.

Figure 11A:
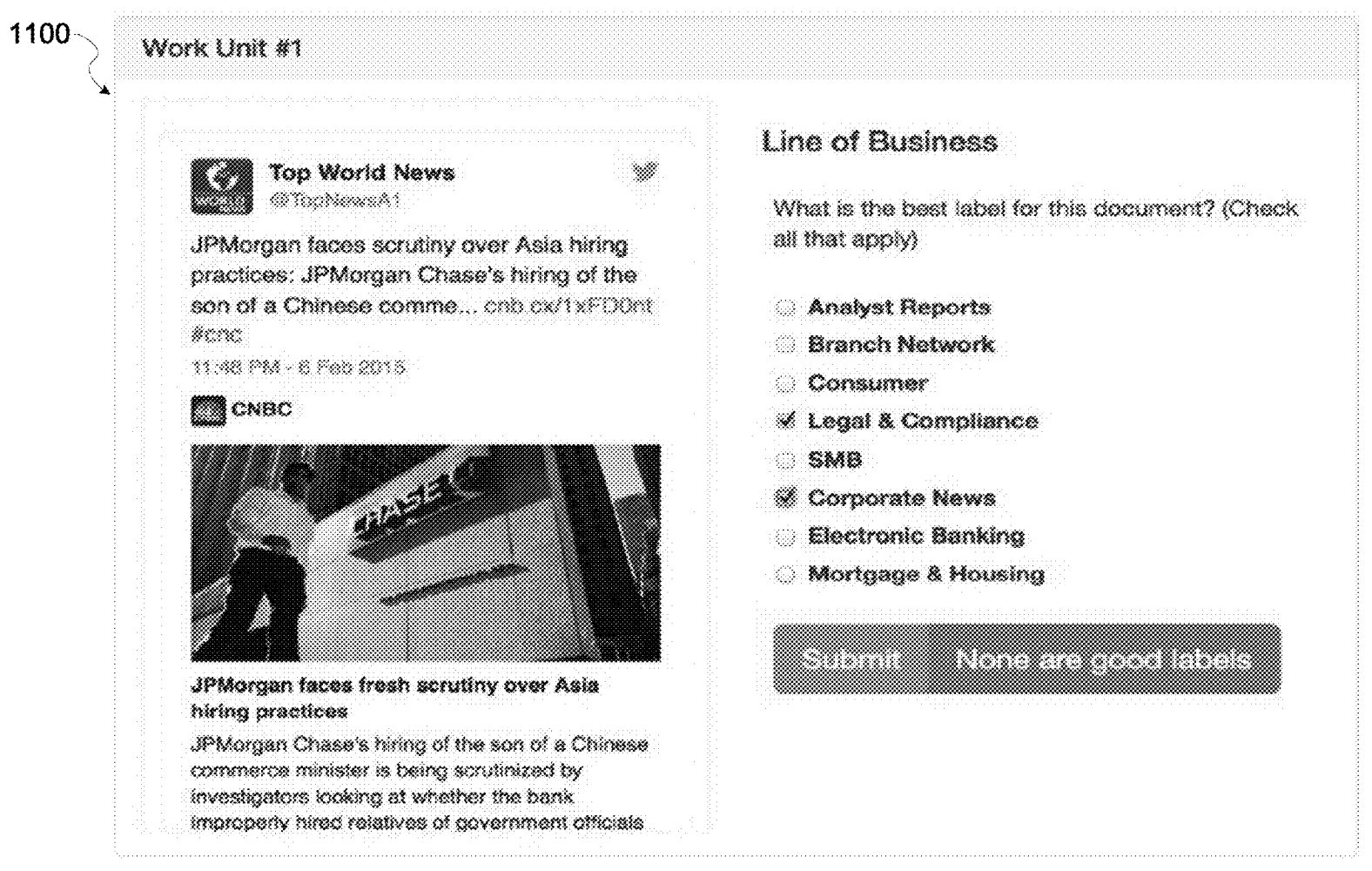

Referring to FIG. 11A, illustration 1100 shows an example display for annotating as part of the adaptive machine learning process, according to some embodiments. As previously mentioned, the adaptive machine learning process according to aspects of the present disclosure include an iterative interplay between annotations of documents and machine learning to generate the natural language model based on the annotations. Illustration 1100 shows an example of one type of annotation applied to a document. In some embodiments and as previously alluded to, the display interface for allowing a human annotator to supply an annotation is called a work unit. In some embodiments, each work unit represents a single task for supplying a single annotation to one document (or span). In some embodiments, the natural language platform is configured to efficiently generate work units such that human annotators' time is efficiently utilized.

As shown in illustration 1100, examples of a work unit may include the text from a document or at least a subset of text. As shown, for example, the document on the left side of the work unit is a tweet from Top World News. The text states, among other things, "J.P. Morgan faces scrutiny over Asia hiring practices: J.P. Morgan Chase's hiring of the son of a Chinese . . . ." This document also includes a photo and a title and introductory words to a news article that is referenced in the Tweet. On the right side of the work units is an annotation prompt, that includes a subject header and a human readable question. The annotation prompt, including the human readable question, may be generated automatically by the natural language platform. The natural language platform may determine the form of the question so as to most efficiently retrieve the desirable annotation from the annotator. In this case, the natural language platform has generated a human readable question that prompts the annotator to select as many topics (labels) that the annotator believes best applies to the document on the left. This type of question is a rather open ended question, and in other cases, the natural language platform may be configured to generate more pointed questions when it has determined that it needs more specific information. In this case, the annotator has selected two labels that he or she believes is most applicable: "legal & compliance," and "corporate news." Once submitted, this particular document would then have this particular annotation applied to it. Additional annotations may be applied to this document based on inputs from other annotators, when the other annotators see this particular work unit or other work units that include this particular document.

Referring to FIG. 11B, illustration 1150 represents another example of a work unit used to annotate a document, according to some embodiments. Like before, the text of the document to be annotated is shown on the left. On the right side of the work unit is the annotation prompt, which includes a header and a human readable question for the annotator to answer. In this case, the question of "What is the best label for this document?" allows for the annotator to select only one of three options: "highly relevant," "semi-relevant," and "totally irrelevant." In some embodiments, the annotator may have been provided training guidelines to help define for the annotator what it means for something to be relevant, semi-relevant, or irrelevant. For example, a training guideline may have instructed the annotator to determine the relevance of the document to the topic of "corporate finance." In addition, the training guideline may have provided definitions to distinguish between the document being highly relevant versus merely semi-relevant. In some embodiments, a button or icon for the training guideline may be placed in the display of the work unit that displays the training guideline when the button or icon is pressed. In other cases, a previous display screen may have provided instructions based on the training guidelines to the annotator to prepare the annotator for how to respond to the annotation prompts.

Still referring to illustration 1150, the type of annotation prompt shown here is a more narrow scope than in illustration 1100. Here, the annotator is restricted to selecting only one of the three options. In contrast, the annotator in illustration 1100 is allowed to select as many options as deemed relevant. In some embodiments, these differences in questions and their intended scopes are intentionally and automatically produced by the natural language platform and may be based on what type of information the natural language platform desires to gain from the annotators.

For example, if the natural language platform is in the early training phases for generating the natural language model, general information about the various types of documents may be desired. Therefore, the types of annotation prompts may be more open ended, and may allow for annotators to answer broad questions, such as questions that may have multiple answers (e.g., see illustration 1100).

As another example, if the natural language platform is in more mature training phases, more specific information to refine determination between labels may be desired. Therefore, the natural language platform may desire specific information to determine differences between two specific labels. The natural language platform may be configured to generate an annotation prompt that directs the annotator to distinguish the two specific labels using a pertinent document. In this case, an example annotation prompt may include the question, "Is the best label for this document label 'A' or label 'B'?" Then, the natural language platform allows the annotator to select between only label A or label B.

In general, the natural language platform may be configured to generate annotation prompts with varying degrees of specificity, depending on the type of information desired to better refine the natural language model. Other examples can include true/false questions, yes/no questions, and other types of questions that direct and annotator to varying levels of specificity apparent to those with skill in the art, and embodiments not so limited. These varying degrees of specificity also help to efficiently designate a human's time. As there are thousands, millions, or even billions of documents that could be annotated, a human's time can be valuable and scarce, such that the techniques presented herein should determine what documents are most appropriate to be sent to human annotators, and what types of information about the documents should be obtained.

Figure 12:
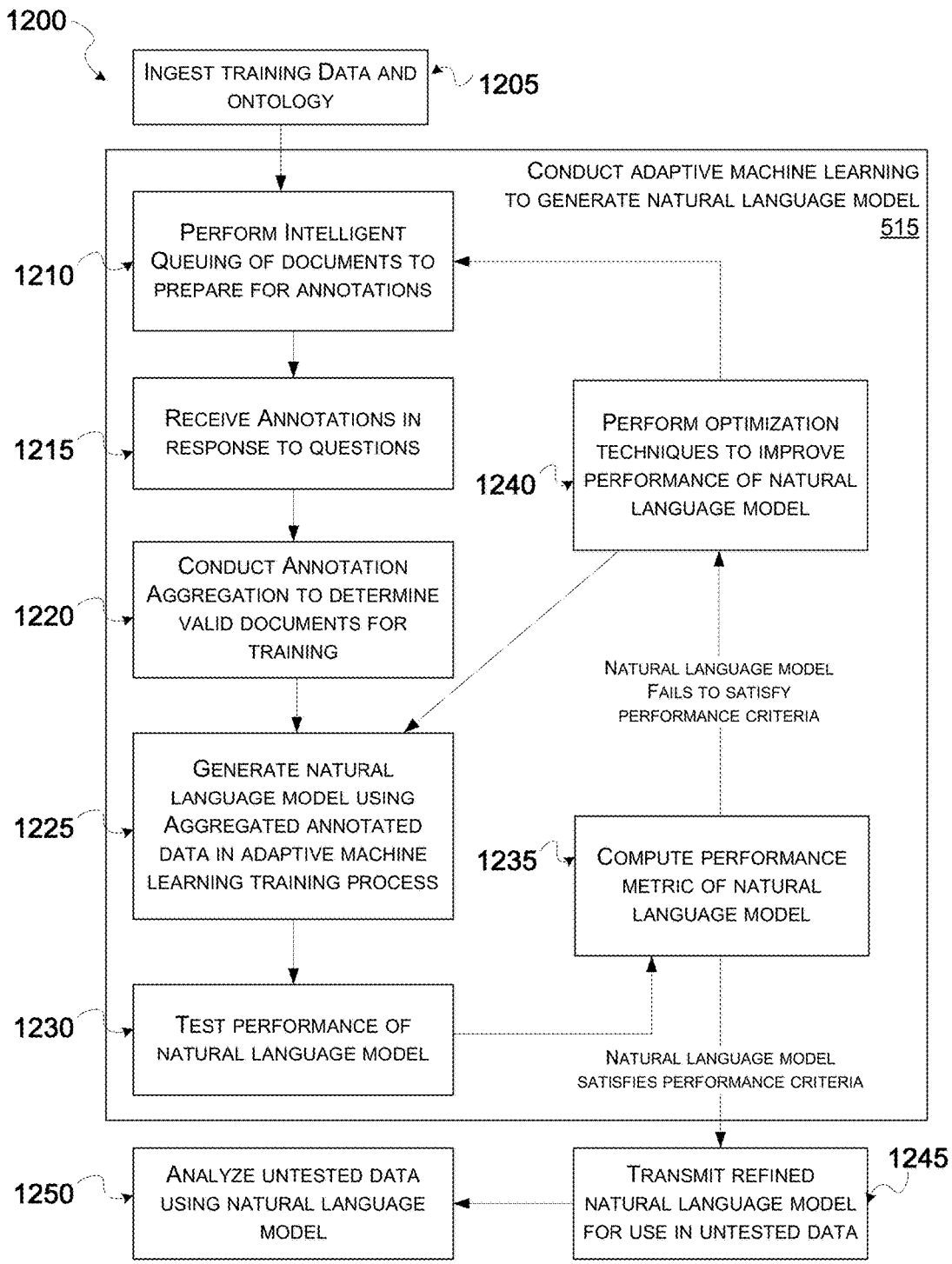
FIG. 12 provides a more detailed process flow of the block 515 of FIG. 5, for conducting the adaptive machine learning process using the annotations to generate the natural language model, according to some embodiments.

With various examples of annotations now described, referring to FIG. 12, flowchart 1200 provides a more detailed process flow for conducting the adaptive machine learning process using the annotations to generate the natural language model, according to some embodiments. The example details herein may represent further details in block 515 of FIG. 5.

This sub process may start with block 1205, involving natural language platform ingesting the data and inputting or applying an ontology for use in the adaptive machine learning process. Examples of these processes are described in previous figures, such as FIG. 6 and FIG. 10. Having accessed the proper data, at block 1210, the natural language platform may begin the adaptive machine learning process to generate a natural language model by selecting particular documents to be annotated. The process for selecting which documents are to be annotated may be referred to herein as "intelligent queuing."

In general, annotations to documents may be useful in aiding a computer to find patterns in the text of the collection of documents in order to determine how the document should be classified. The higher number of documents that are annotated, the more reliable it should be for the computer to create an accurate natural language model for the overall collection of documents. However, obtaining annotations for tens of thousands or even millions of documents in a collection may be impractical, and in some cases, a substantially fewer number of documents that are carefully selected may help produce a natural language model with substantially the same performance. For example, obtaining annotations for certain documents that are representative of the various topics or labels in the ontology, as opposed to exhaustively obtaining annotations for all documents in a single topic, may be a more efficient use of a human annotator's time. As another example, it may be more useful to obtain an annotation for a document that is more complex or possesses content that may arguably be categorized into two or more labels, as opposed to a document that is unambiguously within just a single label, because the annotation may help the machine learn what to do in potentially ambiguous cases consistent with this document. The process of performing intelligent queuing includes these processes of carefully selecting which documents among an entire collection of documents should be slated to receive annotations, with one objective being to efficiently utilize the human annotator's time.

When performing intelligent queuing in a first iteration, i.e., conducting block 1210 for the first time, the intelligent queuing process may include obtaining a seed set of documents that is representative of the various tasks and labels as outlined in the ontology. Other factors may be included in the seed set of documents, and further details of intelligent queuing are described in application Ser. No. 14/964,520, which again is incorporated herein by reference in its entirety.

After selecting which documents are to be annotated, the process of intelligent queuing at block 1210 may also include generating the annotation questions to be presented to an annotator (or multiple annotators) in order to elicit an annotation response. Examples of various types of annotation questions include the examples in FIGS. 11A and 11B. As previously mentioned, the wording of the question including the level of specificity desired to be elicited from the annotator may be automatically generated by the natural language platform, based on the type of information desired when performing intelligent queuing. Thus, block 1210 may also include causing display of the annotation prompt in a work unit that is accessible to an annotator. This may be displayed in one of the application modules 225, for example. Other example displays are provided in application Ser. No. 14/964,522, which again is incorporated herein by reference.

In some embodiments, providing annotation questions in the intelligent queuing process may also include presenting the annotation questions of the same document to multiple annotators. In this way, a single annotator may not be relied on to provide the annotation to a single document. For example, a single annotator may make mistakes, or in worst cases a single annotator may intentionally provide wrong answers. For example, obtaining annotations from annotators may involve a crowdsourcing process, and it may not be known the reliability of any single annotator.

At block 1215, the natural language platform may be configured to receive annotations in response to the annotation questions generated in block 1210. In between blocks 1210 and 1215, one or more annotators may interact with a graphical user interface to analyze one or more documents and provide annotations according to the annotation prompts supplied by the natural language platform. For example, an annotator may answer a question similar to one of the questions in FIG. 11A or 11B. These responses may be stored in a database repository, such as in the database modules 210.

At block 1220, in the event that multiple annotators supply annotations to the same document, in some embodiments, the natural language platform may be configured to conduct an annotation aggregation process that analyzes all of the annotations made to a single document to determine whether said document may be reliably annotated for use in training the natural language model. For example, if six annotators provided annotations to the same document, and three annotators classified the document as belonging to a first label, while the other three annotators classified the document as belonging to a second label, then the annotation aggregation process of block 1220 may determine that this documents is too ambiguous to be used in the adaptive machine learning training process. As another example, if five of the six annotators provided a consistent annotation to the document, while a sixth annotator provided a different annotation, it may be determined that this document has sufficiently consistent annotations so as to be used in the adaptive machine learning process.

In general, in some embodiments, the annotation aggregation process of block 1220 may include computing an annotation aggregation score based on the total number of annotations and reflecting a level of agreement between the annotations. Based on this computed score, in some embodiments, the annotation aggregation process may determine whether the document may be used to train the natural language model, e.g., if the score satisfies a first threshold criterion. In addition, in some embodiments, based on the score, it may be determined that additional annotations from other annotators should be elicited before the document may be used in the model training process, e.g., if the score satisfies a second threshold criterion. In addition, in some embodiments, based on the score, and may be determined that the document should not be used for the model training process, e.g., if the score satisfies a third threshold criterion. This process may be applied for each document to determine if said document is valid for training the natural language model. Further details about the annotation aggregation process are described in application Ser. No. 14/964,528, which again is incorporated herein by reference in its entirety.

At block 1225, the natural language platform may be configured to generate the natural language model using the aggregated annotated data (e.g. documents with consistent enough aggregation score) in an adaptive machine learning training process. In general, the adaptive machine learning training process may find patterns in the training data (e.g., aggregated annotated data) that may be used to make predictions about untested data. The process for adaptive machine learning according to some embodiments includes: (a) elicit annotations from humans (b) build initial version of model (c) evaluate the effectiveness of the model and determine if stopping criteria have been met (d) identify specific areas of improvement and annotations required for improvement in those areas (e) queue additional documents for human annotations, and serve those documents to the optimal annotator with the optimal interface for the combination of annotator and task (f) update the model using the new annotations (g) repeat the whole process until stopping criteria are met. From this, a first version of the natural language model may be generated, and, if desired, continually updated new versions of the model as well.

In general, the natural language platform according to aspects of the present disclosure first seeks to obtain annotations for particular documents before conducting any machine learning techniques. Receiving annotations before conducting any machine learning techniques may allow for the adaptive machine learning process to be more efficient, in that the adaptive machine learning begins building the natural language model from documents whose "true values" are already known, e.g., the documents already have reliable annotations.

At block 1230, the natural language platform may be configured to test the performance of newly created natural language model, according to some embodiments. Testing the performance of the natural language model may allow the natural language platform (and/or a user) to determine later on whether the natural language model should be refined and improved before being finalized.

In some embodiments, testing the performance of the natural language model at block 1230 includes performing a cross validation process. For example, the cross validation process may involve creating a first "test" natural language model, using the same adaptive machine learning training process to generate the original natural language model, but based on only a subset of the training data, e.g., 90% of the documents in the training data (e.g., supposing there are 1000 documents in the training data, then documents 1-900). This first "test" natural language model is tested by applying the first "test" natural language model on the remaining 10% of the documents not used to create the first "test" natural language model, but still already having annotations. In this way, the veracity of the first test natural language model may be compared against "true answers" provided by the original annotations of the remaining 10% of the documents. The cross validation process may also involve creating a second "test" natural language model, using the same adaptive machine learning processes to generate the original natural language model, but based on a different subset of the training data, e.g., a different 90% of the training data (e.g., documents 1-800 and 901-1000). This second test natural language model may be tested in the same way as the first test natural language model, and therefore may assess the veracity of the second test natural language model against the second 10% subset of the training data (e.g. documents 801-900). This cross validation process may continue each for a different 90% of the training data (for a total of 10 different iterations), so that the veracity of the machine learning process used to the create original natural language model (and each of the test natural language models) may be verified against different subsets of the training data, and ultimately against all of the training data divided into separate parts, where the "true answers" are known. Because all of the training data is being tested against, and because the test natural language models are generated using the same machine learning process as the one used to generate the original natural language model in question, the aggregate performances of the test natural language models is used as a reliable approximation to the original natural language model. In general, subdividing the training data into 10% increments is merely one example, and other partitions may be used.

At block 1235, after having tested the performance of the natural language model, either through the example cross validation process just described or through other validation processes apparent to those with skill in the art, the natural language platform may be configured to generate a performance metric of the natural language model, based on the tests run against it. For example, if the performance of the natural language model was determined using the after mentioned cross validation techniques, one or more metrics quantifying a degree of accuracy may be supplied. In other cases, one accuracy measurement for each of the "test" models in the cross validation process may be supplied, and the natural language platform may be configured to provide an aggregate score at block 1235. In some embodiments, these performance metrics may be displayed, such as in application modules 225. Other examples of these performance metrics are described in application Ser. No. 14/964,520, which is again incorporated herein by reference. Example performance metrics include: model precision, recall, and f1-measure, derived through cross-validation; area under the receiver operating characteristic curve (AUC); rate of improvement in precision, recall, and/or f1-measure as a function of the number of annotations; and percentage of the feature vocabulary in the total collection that is represented in the annotated data set.

From here, the natural language platform may determine if the performance of the natural language model satisfies one or more performance criteria. The one or more performance criteria may include a pre-determined threshold, or in other cases may be specified by a user. In the event that the natural language model satisfies the performance criteria, the process may proceed to block 1245. Otherwise, the process may proceed to block 1240, where the natural language model is to be refined through one or more optimization techniques according to some embodiments.

At block 1240, supposing that the natural language model fails to satisfy the one or more performance criteria, the natural language platform may be configured to perform various optimization techniques to improve the performance of the natural language model, according to some embodiments. Numerous examples of optimization techniques are described in FIG. 13 below. Some or all of the techniques may be performed, and embodiments are not so limited.

In some embodiments, one of the optimization techniques includes conducting another iteration of annotations on the same or different documents among the collection of documents. In other words, the process in flowchart 1200 may cycle back to block 1210, consistent with the iterative adaptive machine learning process described above. For example, through the tested performance of the natural language model at block 1230, it may have been determined that the natural language model accurately predicts documents for certain labels, while it struggles to predict documents into other labels in the ontology. The natural language platform may therefore be configured to conduct a second iteration of intelligent queuing that aims to obtain annotations from documents to help resolve labels that the original natural language model showed unsatisfactory performance in. Further example details of how the tested performance of the previous iteration of the natural language model may be used to guide a subsequent instance of intelligent queuing is described in application Ser. No. 14/964,520, which is again incorporated herein by reference.

To complete one or more iterations of refinement of the natural model, the adaptive machine learning process may continue through blocks 1215 through 1235, consistent with the descriptions above but with new annotations and possibly other optimization techniques performed to generate the revised natural language model. In other cases, after one or more optimization techniques are performed at block 1240, rather than repeat through block 1215 to 1220, the model generation process may proceed straight to block 1225 to generate an updated natural language model using the updated parameters from the one or more optimization techniques and the existing aggregated annotations. Ultimately, it may be determined that the natural language model satisfies the one or more performance criteria, at which point the process may proceed to block 1245. Here, the finalized natural language model may be transmitted to make predictions on untested data. The finalized natural language model may be transmitted to a system exclusively controlled by a client, such as in some of the examples shown in FIG. 2A, or in other cases may be transmitted to specific devices, such as devices 120 or 130.

In some embodiments, the transmitted natural language model may be stored in a format that is universally portable. For example, the natural language model may be stored in memory efficiently such that the same model may be executable in mobile devices as well as conventional computers. Additional details of the universal portability aspect according to some embodiments are described further in application Ser. No. 14/964,526, which is incorporated herein by reference in its entirety.

At block 1250, the natural language model may be used to analyze untested data. The untested data may be based on data obtained from the client not used as part of the training data, while in other cases the untested data may include live or real-time data, such as live streams of tweets or customer service emails. In general, the natural language model may analyze untested data by classifying each unit of the untested data into one or more of the tasks or labels as organized in the ontology. The natural language model may be used on millions or even billions of units of data.

Figure 13:
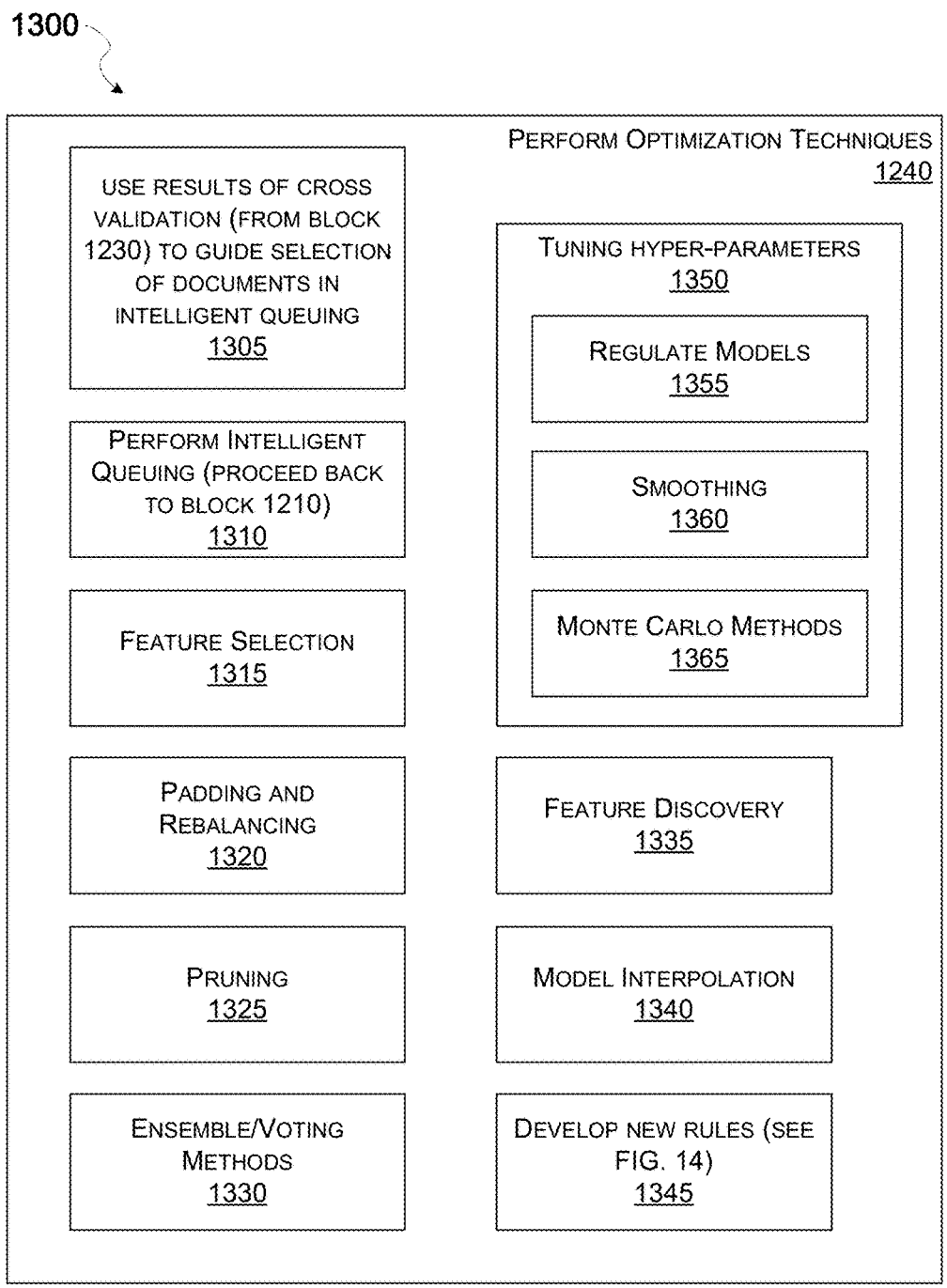
FIG. 13 provides further details of different examples of optimization techniques that may be applied in block 1240 of FIG. 12 for performing optimization techniques to improve the natural language model, according to some embodiments.

Referring to FIG. 13, illustration 1300 provides further details of different examples of optimization techniques that may be applied in block 1240 of FIG. 12 for performing optimization techniques to improve the natural language model, according to some embodiments. The following are some descriptions of each of the different examples listed, although some embodiments may use only some of these examples, and embodiments are not so limited.

At block 1305, one example for performing optimization techniques to improve the natural language model may include using the results from cross validation or other performance evaluation techniques to guide the selection of further documents to be annotated when performing a next iteration of intelligent queuing. As previously mentioned, additional annotations to documents, either to some of the same documents or even new documents, may be sought after to help resolve some ambiguities in the natural language model or to help improve areas that the natural language model has shown difficulty in classifying. To determine which documents should be used in this next round of annotations, the intelligent queuing process according to aspects of the present disclosure may base these decisions on the performance results generated by performing the cross validation or other performance evaluation techniques from block 1230 of FIG. 12. Further example details for how the intelligent queuing process utilizes the performance evaluation techniques from block 1230 are described in application Ser. No. 14/964,520, which is again incorporated herein by reference. Block 1305 may also include a process for what type of annotation questions should be presented to an annotator to achieve the proper level of detail for improving the natural language model.

At block 1310, another example technique includes performing the intelligent queuing process itself, which is to say that the process proceeds back to block 1210, which has already been discussed.

At block 1315, another example optimization technique includes performing feature selection. Feature selection may include applying one or more transformations to each annotated document to generate a set of machine learning features for that document, applying one or more evaluation metrics to each feature to estimate the relative importance of each feature to the natural language model, and finally selecting an appropriate subset of features for inclusion in the natural language model. For example, every token in each document may be designated as a feature, and each feature may be ordered based on the frequency it appears in the total set. Other examples may use statistical co-occurrence criteria (such as chi square and mutual information) or information theoretic criteria (such as information gain) to perform feature evaluation. The feature transformation process is described in more detail in application Ser. No. 14/964,525, again incorporated herein by reference.

At block 1320, another example includes performing padding and rebalancing of the data in a natural language model. This may include duplicating or deleting specific annotations to create an artificial mix of training items to improve model performance in specific areas. Padding and rebalancing may include identifying individual items in the data that are representative of rare but significant labels in the ontology and artificially duplicating these items so that they make up a larger proportion of the training data used to develop the natural language models. This technique can also be referred to as "upsampling." For example, if positive items are rare relative to negative items in a set of training data used to develop a sentiment classification model, the positive items identified during annotation can be copied one or more times and included in the training data for the model. The number of times that the positive items are copied can be determined through a number of optimization techniques in machine learning, including cross validation. Cross validation can identify the number of positive and negative items to include in training that will achieve the best model performance (as measured by accuracy, precision, recall or f-score) by cyclically adjusting the numbers of items in each category, retraining the model, and testing the performance of the resulting model. Alternatively, individual items in the data that cause the natural language model to make erroneous classifications may be removed from the training data to improve model performance. This technique can also be referred to as "downsampling."

At block 1325, another example includes performing pruning techniques. Pruning techniques may include processes to reduce the size and complexity of certain types of statistical models such as decision trees that are used to develop natural language models. Pruning has the benefit of reducing the tendency of a model to represent noise in the data (overfitting) by removing parts of the model that are useful in classifying only a small number of items in the training data. For example, a natural language model that is trained to distinguish five different topical categories of news articles using decision trees and individual word features, may perform well on training data, but poorly on unseen data. In order to improve the generalizability of the model and to make performance more consistent, certain nodes or features used by the model that only help in classifying less than 1% of the data may be trimmed away or removed to simplify the model and improve performance across different data sets.

At block 1330, another example includes performing ensemble or voting methods. This may include combining multiple pre-trained natural language processing models to generate multiple predictions for each unlabeled item in the data set, identifying the items in the dataset that meet specific prediction matching criteria (e.g., unanimous, majority, at least n), and using these items to train a new natural language processing model. This approach may sometimes be referred to as semi-supervised machine learning. In some embodiments, the pre-trained models have been trained using a subset of training items from the target data set. In other embodiments, the pre-trained models have been trained using training items from external data sets. A variety of matching criteria can be applied to the resulting predictions to identify items that meet the minimum requirements for being included as training items in a new natural language model. In some embodiments, a majority vote of the models will determine the label that is assigned to an item in the dataset. For example, in an ensemble of six different sentiment models, if four models predict that an unlabeled tweet is positive, and two models predict that that same tweet is negative, the item will be assigned a positive label and subsequently used for training a new sentiment model. On the other hand, if three of the models predict that an unlabeled tweet is positive, and three models predict that it is negative, the item will not be assigned a label and will not be used for training a new sentiment model. In other embodiments, an unlabeled item will receive a label only if that label corresponds to at least n matching predictions from the ensemble of classifiers. In other embodiments, an unlabeled item will receive a label only if that label corresponds to a unanimous set of predictions from the ensemble of classifiers.

At block 1335, another example includes performing feature discovery. This may include identifying the set of feature transformations and feature selection critera that provide the highest model performance for the provided data. In some embodiments, the set of selected feature transformations and feature selection criteria can be represented as a string of independent binary values. For example, each supported feature transformation or selection criteria may be assigned a position within the string, where a 1 value corresponds to the feature or criteria being enabled and a 0 corresponds to disabled. In such embodiments, a genetic search process may then be used to iteratively define numerous configurations, training and evaluating each in sequence according to the training and testing processes 1225, 1230 and 1235 in FIG. 12, refining and improving the configuration each iteration. In such embodiments, the final configuration of feature transformations and selection criteria may be saved to a database so that later applications of the feature selection process 1315 use the optimized configuration.

At block 1340, another example includes performing model interpolation. This may include combining model parameters from at least one previous model with a provided set of model parameters for the desired model to create an interpolated model which has greater performance than would be achieved from the provided set of model parameters. In some embodiments, the parameters incorporated from the at least one previous model may include the annotations and documents used to train each previous model, and the provided parameters for the desired model may include a set of label names, documents, annotations, and rules. In some embodiments, the interpolated model is generated by selecting the parameters from the at least one previous model which do not conflict with the provided parameters, and proceeding with the model training and optimization processes using the combined data set. For example, a previous model may include a large set of English social media posts from Twitter® discussing a variety of topics of general interest (movie releases, consumer electronics, recent personal experiences, and current events), and annotations imputed to each document according to the sentiment ("positive" or "negative") conveyed by that document. Conventionally, such models perform with poor accuracy when applied to process text that uses highly specific and unique terminology; for example, social media posts about the finance industry. According to some embodiments, an interpolated model may be generated by providing a small amount of parameters (for example, a rule defining "overweight" as conveying "positive" sentiment), combined with the documents and annotations from the previous model parameters that do not conflict with this. In this way, highly accurate domain-specific models may be interpolated from a large amount of previous parameters and a comparatively small amount of provided parameters.

At block 1345, another example includes developing new rules for use in defining the ontology or additional annotations. Further descriptions for how the new rules may be implemented are described in FIG. 14, below.

At block 1350, another example includes tuning model training hyper-parameters. Examples of model hyper-parameters include regularization constraints applied to the entire model training process (such as a constraint on the $L_1$ or $L_2$ norms), e.g., at block 1355, or adding a smoothing term to each feature individually during the feature selection process (such as a Laplacian smoothing term), e.g., at block 1360. Conventional machine learning techniques produce models which attempt to closely match their training data. For example, in a set of documents about "Bill Clinton" that each have associated annotations imputing "positive" or "negative" sentiment, a small subset of such documents may be found to also discuss "Kenneth Starr," with an overwhelming percentage of this subset imputed as conveying "negative" sentiment. In such a case, a conventional model training process may learn to interpret "Kenneth Starr" as strongly conveying "negative" sentiment, although this learned interpretation is an artifact of limited training examples rather than an actual conveyance of "negative" sentiment; such a case is known to those with skill in the art as an example of "over-fitting." In such cases, introducing hyper-parameter constraints can be used to penalize rare terms, such that the model training process will not treat such terms as strong conveyances of any label. In some embodiments, each hyper-parameter may assume an infinite number of possible values (for example, a scale factor or additive term that may be assigned any numerical value). In such embodiments, selecting appropriate hyper-parameter values involves training and evaluating a large number of models with different hyper-parameter configurations. In some embodiments, Monte Carlo techniques, e.g., block 1365, such as the Metropolis-Hastings algorithm may be used to iteratively select and refine hyper-parameter values until a suitably accurate model is created or a maximum number of iterations have been performed.

In general, the iterative process as described in flowchart 1200 may efficiently develop a natural language model by identifying and focusing on problem areas of the natural language model through multiple annotation and test phases. In this way, whereas conventional processes for developing a natural language model may take up to six months, achieving the same performance through aspects of the present disclosure may take only three weeks. In general, the processes described herein for producing a natural language model drastically reduce time to convergence and efficiently utilize time spent by humans to provide input for the machine learning components.

Figure 14:
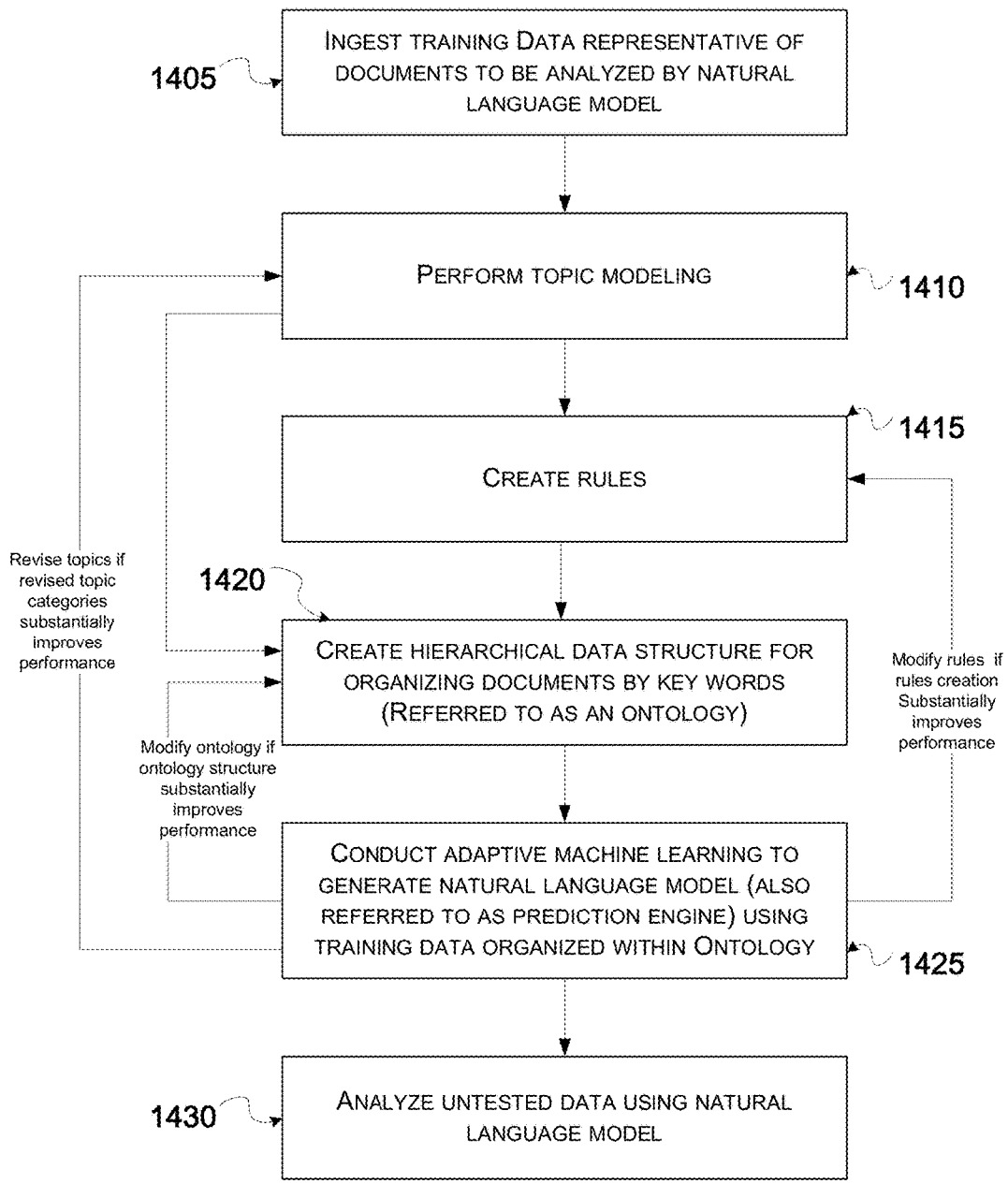
FIG. 14 illustrates a modified process for generating natural language models, including iterating processes between some processes within the create ontology block and the conduct adaptive machine learning block of FIG. 5, according to some embodiments.

Referring to FIG. 14, flowchart 1400 illustrates a modified process for generating natural language models, including iterating processes between some processes within the create ontology block and the conduct adaptive machine learning block of FIG. 5, according to some embodiments. In previous descriptions, iterative processes were described to occur within the create ontology block 510 and within the conduct adaptive machine learning block 515. In some embodiments, a third relationship of iterations may also be allowed, such as processes within the adaptive machine learning block 515 iterating back to certain blocks within the create ontology block 510. For example, as shown in flowchart 1400, while blocks 1405, 1410, 1415, and 1425 may include descriptions that are consistent with a first iteration of processes described in previous figures, such as in FIGS. 5, 10, and 12, additional iterative loops may also be possible from the adaptive machine learning block 1425.

For example, after at least a first iteration of the natural language model is generated at block 1425, consistent with the descriptions in FIG. 12, it may be determined that the ontology could be modified to improve model performance. Thus, from block 1425, the natural language platform may be configured to proceed back to block 1420 to allow for the ontology to be modified. For example, the natural language model may access inputs provided by analysts to modify one or more of the labels or tasks in the ontology.

As another example of an iterative loop, it may be determined that rules may be modified to improve performance of the natural language model. Thus, from block 1425, the natural language platform may be configured to proceed back to block 1415, which in some cases is a sub process within the overall process for creating the ontology. To modify some of the rules, the natural language platform may be configured to apply a weight to each of the rules, where the weight represents a degree to which the rules should be heeded in comparison to other rules. For example, a weight of 1.0 for a rule may signify that the rule should always be followed, whereas a weight of 0.5 may signify that the rule should be followed according to a probabilistic formula that may factor in additional statistical parameters, resulting in a composite statistical score to determine how to classify a document. Thus, modifying the rules may also include adjusting any weights to the rules. Modifying the rules may also involve creating new rules or modifying the logical parameters to which the rules should be applied.

After any rules are modified at block 1415, the process may again proceed to block 1420, and continue down the process in another iteration.

As another example of an iterative loop, and may be determined that new topics should be discovered or topics may need to be refined or modified in some way. Thus, from block 1425, the natural language platform may be configured to proceed back to block 1410 to conduct topic modeling again, which in some cases is a sub process within the overall process for creating the ontology. To modify any topics, the natural language platform may be configured to accept various parameters for discovering new topics. For example, new documents may be accessed, or certain documents may be given more weight. In other cases, the natural language platform may receive inputs to merge certain topics together into a single composite task or label within the ontology. In other cases, the natural language platform may be configured to receive inputs to divide one or more topics into multiple topics. Analysts may be offered displays of various metrics that express levels of agreement or levels of performance of the natural language model when the topics are organized in one configuration versus another configuration. The analysts may then be able to compare how the model may improve if various topics are modified. Example displays for these various interfaces for modifying the topics, the rules, or the ontology may be described further in application Ser. No. 14/964,522, which again is incorporated herein by reference.

In some cases, after modifying any of the topics at block 1410, the process may proceed directly to block 1420 to modify the ontology in light of the newly modified topics. In other cases, and may also be desirable to modify any rules, so the modification iteration may move from block 1410 to block 1415 before proceeding to block 1420.

In some embodiments, these iterative processes may cease once performance of the natural language model is determined to satisfy some threshold criterion. At that point, the natural language model may be available for use to analyze untested data at block 1430.

Figure 15:
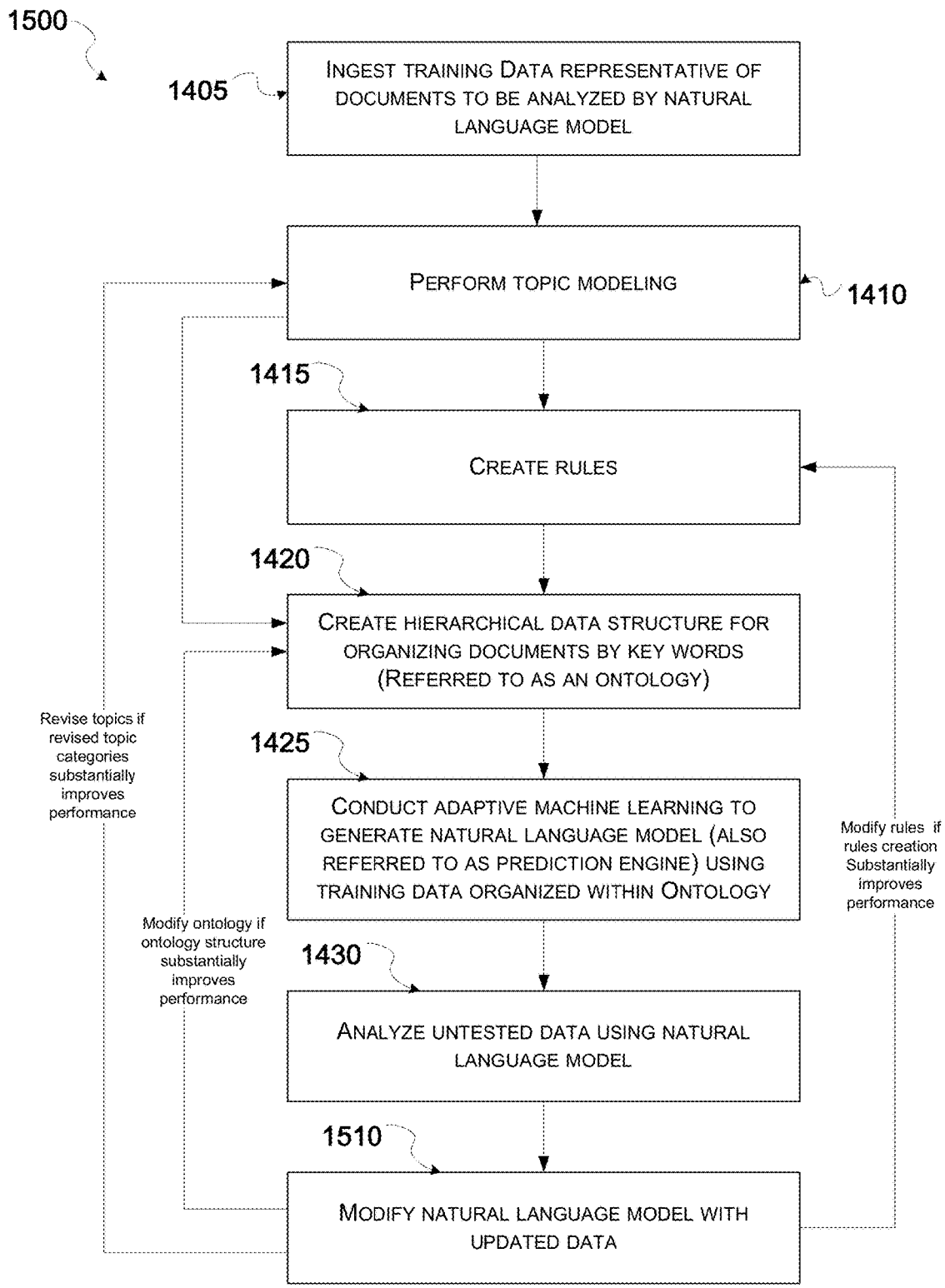
FIG. 15 provides an additional variant for generating natural language models, this time including a maintenance process for updating currently operating natural language models, according to some embodiments.

Referring to FIG. 15, flowchart 1500 provides an additional variant for generating natural language models, this time including a maintenance process for updating currently operating natural language models, according to some embodiments. As shown, the various functional blocks in flowchart 1400 remain the same, but in addition, after the natural language model is in use to analyze untested data at block 1430, an additional block 1510 is provided to modify the currently running natural language model with updated data. The model may need to be updated periodically in order to adjust to changing language that may occur in certain collections of documents. For example, if the model is analyzing communications on Twitter, new idioms and slang may inevitably be communicated in tweets over time. A model trained six months ago may therefore lack proper training for how to handle any new changes in language.

Rather than generate a completely new model, the existing natural language model may simply be retrained with updated data. The retraining may include revising or discovering new topics, modifying or creating new rules, or modifying the ontology structure to account for the updated data. Thus, the natural language platform may be configured to retrain the model with updated data by proceeding to either block 1410, 1415, or 1420, depending on the need. In some embodiments, modifications may include simply conducting one or more rounds of adaptive machine learning at block 1425, first by performing intelligent queuing to generate new annotations for the updated data.

In general, generating natural language processing models using the descriptions provided herein allows for: production of the models in a substantially shorter time period than conventional methods (e.g., highly accurate and fast performing models generated in a period of weeks rather than months), highly adaptive models that can evolve with changing input data, maintaining of consistent levels of model performance over time, the ability to leverage existing models and training data to develop domain-specific models with fewer new annotations, and the ability to add new labels and categorizations as requirements change.

Figure 16:
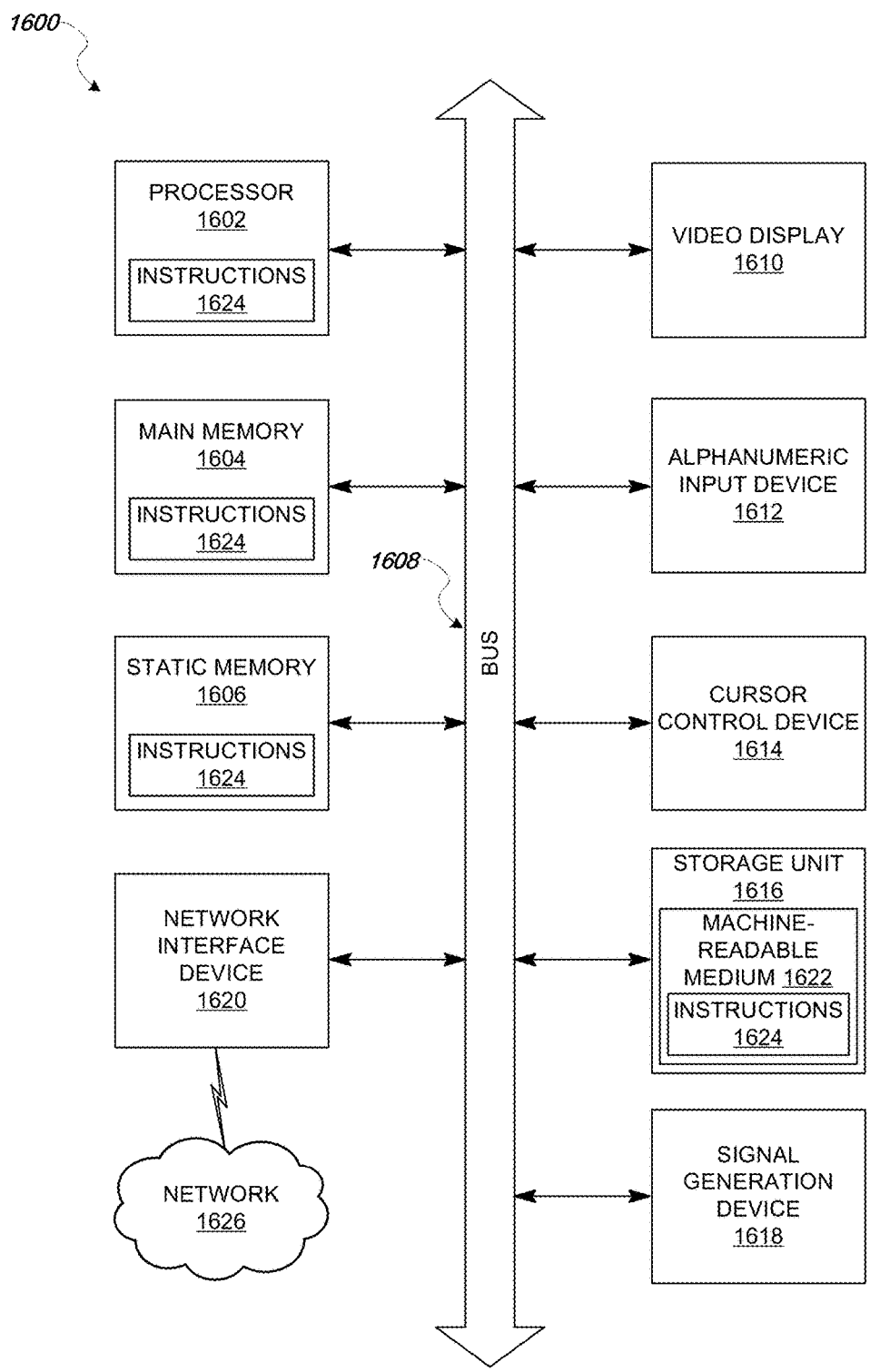
FIG. 16 is a block diagram illustrating components of a machine, according to some example embodiments, able to read instructions from a machine-readable medium and perform any one or more of the methodologies discussed herein.

Referring to FIG. 16, the block diagram illustrates components of a machine 1600, according to some example embodiments, able to read instructions 1624 from a machine-readable medium 1622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 16 shows the machine 1600 in the example form of a computer system (e.g., a computer) within which the instructions 1624 (e.g., software, a program, an application, an applet, an app, or other executable code) for causing the machine 1600 to perform any one or more of the methodologies discussed herein may be executed, in whole or in part.

In alternative embodiments, the machine 1600 operates as a standalone device or may be connected (e.g., networked) to other machines. In a networked deployment, the machine 1600 may operate in the capacity of a server machine 110 or a client machine in a server-client network environment, or as a peer machine in a distributed (e.g., peer-to-peer) network environment. The machine 1600 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1624, sequentially or otherwise, that specify actions to be taken by that machine. Further, while only a single machine 1600 is illustrated, the term "machine" shall also be taken to include any collection of machines that individually or jointly execute the instructions 1624 to perform all or part of any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The processor 1602 may contain microcircuits that are configurable, temporarily or permanently, by some or all of the instructions 1624 such that the processor 1602 is configurable to perform any one or more of the methodologies described herein, in whole or in part. For example, a set of one or more microcircuits of the processor 1602 may be configurable to execute one or more modules (e.g., software modules) described herein.

The machine 1600 may further include a video display 1610 (e.g., a plasma display panel (PDP), a light emitting diode (LED) display, a liquid crystal display (LCD), a projector, a cathode ray tube (CRT), or any other display capable of displaying graphics or video). The machine 1600 may also include an alphanumeric input device 1612 (e.g., a keyboard or keypad), a cursor control device 1614 (e.g., a mouse, a touchpad, a trackball, a joystick, a motion sensor, an eye tracking device, or other pointing instrument), a storage unit 1616, a signal generation device 1618 (e.g., a sound card, an amplifier, a speaker, a headphone jack, or any suitable combination thereof), and a network interface device 1620.

The storage unit 1616 includes the machine-readable medium 1622 (e.g., a tangible and non-transitory machine-readable storage medium) on which are stored the instructions 1624 embodying any one or more of the methodologies or functions described herein, including, for example, any of the descriptions of FIGS. 1A-15. The instructions 1624 may also reside, completely or at least partially, within the main memory 1604, within the processor 1602 (e.g., within the processor's cache memory), or both, before or during execution thereof by the machine 1600. The instructions 1624 may also reside in the static memory 1606.

Accordingly, the main memory 1604 and the processor 1602 may be considered machine-readable media 1622 (e.g., tangible and non-transitory machine-readable media). The instructions 1624 may be transmitted or received over a network 1626 via the network interface device 1620. For example, the network interface device 1620 may communicate the instructions 1624 using any one or more transfer protocols (e.g., HTTP). The machine 1600 may also represent example means for performing any of the functions described herein, including the processes described in FIGS. 1A-15.

In some example embodiments, the machine 1600 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1622 able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database 115, or associated caches and servers) able to store instructions 1624. The term "machine-readable medium" shall also be taken to include any medium, or combination of multiple media, that is capable of storing the instructions 1624 for execution by the machine 1600, such that the instructions 1624, when executed by one or more processors of the machine 1600 (e.g., processor 1602), cause the machine 1600 to perform any one or more of the methodologies described herein, in whole or in part. Accordingly, a "machine-readable medium" refers to a single storage apparatus or device 120 or 130, as well as cloud-based storage systems or storage networks that include multiple storage apparatus or devices 120 or 130. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1622 is non-transitory in that it does not embody a propagating signal. However, labeling the tangible machine-readable medium 1622 as "non-transitory" should not be construed to mean that the medium is incapable of movement; the medium should be considered as being transportable from one physical location to another. Additionally, since the machine-readable medium 1622 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1622 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1602 or a group of processors 1602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1602 or other programmable processor 1602. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1608) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1602 that are temporarily configured (e.g., by software) or permanently configured to perform the relevant operations. Whether temporarily or permanently configured, such processors 1602 may constitute processor-implemented modules that operate to perform one or more operations or functions described herein. As used herein, "processor-implemented module" refers to a hardware module implemented using one or more processors 1602.

Similarly, the methods described herein may be at least partially processor-implemented, a processor 1602 being an example of hardware. For example, at least some of the operations of a method may be performed by one or more processors 1602 or processor-implemented modules. As used herein, "processor-implemented module" refers to a hardware module in which the hardware includes one or more processors 1602. Moreover, the one or more processors 1602 may also operate to support performance of the relevant operations in a "cloud computing" environment or as a "software as a service" (SaaS). For example, at least some of the operations may be performed by a group of computers (as examples of machines 1600 including processors 1602), with these operations being accessible via a network 1626 (e.g., the Internet) and via one or more appropriate interfaces (e.g., an API).

The performance of certain operations may be distributed among the one or more processors 1602, not only residing within a single machine 1600, but deployed across a number of machines 1600. In some example embodiments, the one or more processors 1602 or processor-implemented modules may be located in a single geographic location (e.g., within a home environment, an office environment, or a server farm). In other example embodiments, the one or more processors 1602 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 1600 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for generating a natural language model, the method comprising:
ingesting, by a natural language platform comprising at least one processor coupled to at least one memory, training data representative of documents to be analyzed by the natural language model, wherein the training data includes at least one of a first document and a portion of the first document;
generating, by the natural language platform and based on topical content within the training data, a hierarchical data structure, the hierarchical data structure comprising at least two topical nodes, wherein the at least two topical nodes represent partitions organized by two or more topical themes among the topical content of the training data within which the training data is to be subdivided into;
selecting among the training data, by the natural language platform, a plurality of documents to be annotated;
determining, by the natural language platform, for each document among the plurality of documents, a level of ambiguity in interpreting said document that the natural language platform is trying to resolve, wherein the level of ambiguity is dependent upon information currently possessed by the natural language platform;
generating, by the natural language platform, an annotation prompt for each document among the plurality of documents to be annotated, said annotation prompt being dynamically generated as either a first level prompt corresponding to a first level of specificity or a second level prompt corresponding to a second level of specificity, wherein both the first level prompt and the second level prompt comprise a human readable textual instruction generated by the natural language platform worded according to the first level of specificity or the second level of specificity, and the first level prompt and the second level prompt are presented alternatively, the first level of specificity and the second level of specificity corresponding to the level of ambiguity of said document,
said annotation prompt configured to elicit an annotation about said document designed to resolve said level of ambiguity and indicating which node among the at least two topical nodes of the hierarchical data structure said document is to be classified into,
wherein the first level of specificity comprises a first level of true-or-false question and the second level of specificity comprises a multiple-choice question comprising at least three options, wherein the first level of specificity corresponds to a lower level of ambiguity than the second level of specificity;
causing display of, by the natural language platform, the annotation prompt for each document among the plurality of documents to be annotated;
receiving, by the natural language platform, for each document among the plurality of documents to be annotated, the annotation in response to the displayed annotation prompt; and
generating, by the natural language platform, the natural language model using an adaptive machine learning process configured to determine, among the received annotations, patterns for how the documents in the training data are to be subdivided according to the at least two topical nodes of the hierarchical data structure.

2. The method of claim 1, further comprising:
testing, by the natural language platform, performance of the natural language model using a subset of the documents among the training data that received annotations.

3. The method of claim 2, further comprising:
computing, by the natural language platform, a performance metric of the natural language model, based on results of the testing; and
determining whether the natural language model satisfies at least one performance criterion based on the computed performance metric.

4. The method of claim 3, further comprising:
performing, by the natural language platform, one or more optimization techniques configured to improve performance of the natural language platform, in response to determining that the natural language platform fails to satisfy the at least one performance criterion based on the computed performance metric.

5. The method of claim 4, wherein the one or more optimization techniques comprises at least one of: a feature selection process, a padding and rebalancing process of the natural language model, a pruning process of the natural language model, a feature discovery process, a smoothing process of the natural language model, or a model interpolation process.

6. The method of claim 3, further comprising:
determining that the natural language platform fails to satisfy the at least one performance criterion based on the computed performance metric;
in response to said determining:
identifying a topical node among the two or more topical nodes of the hierarchical data structure that the natural language model fails to accurately categorize documents into;
selecting a second plurality of documents to be annotated that were not previously annotated, the second plurality comprising documents associated with said topical node that the natural language model failed to accurately categorize documents into;
generating a second set of annotation prompts comprising an annotation prompt for each document among the second plurality of documents to be annotated, said annotation prompt among the second set comprising a human readable textual communication that is configured to elicit an annotation about said document to improve the natural language model in accurately categorizing documents into said topical node;
causing display of the second set of annotation prompts for documents among the second plurality of documents to be annotated;
receiving, by the natural language platform, for documents among the second plurality of documents to be annotated, a second set of annotations in response to the second set of displayed annotation prompts; and
generating, by the natural language platform, a refined natural language model using the adaptive machine learning process and based on the hierarchical data structure, the training data and the second set of annotations.

7. The method of claim 1, wherein generating the hierarchical data structure comprises:
performing a topic modeling process configured to identify two or more topics among the content of the training data that is configured to define the two or more topical nodes of the hierarchical data structure.

8. The method of claim 1, further comprising accessing one or more rules configured to instruct the natural language model how to categorize one or more documents into the two or more nodes of the hierarchical data structure.

9. The method of claim 8, wherein generating the hierarchical data structure comprises:
conducting a rules generation process configured to evaluate logical consistency among the one or more rules.

10. The method of claim 1, wherein generating the hierarchical data structure comprises:
generating, by the natural language platform, at least one annotation prompt for each topical node among the two or more topical nodes in the hierarchical data structure, said annotation prompt configured to elicit an annotation about said topical node indicating a level of accuracy of placement of the node within the hierarchical data structure;
causing display of, by the natural language platform, the at least one annotation prompt for each topical node; and
receiving, by the natural language platform, for each topical node, the annotation in response to the displayed annotation prompt.

11. The method of claim 10, further comprising evaluating performance of the hierarchical data structure based on the annotations.

12. The method of claim 11, further comprising in response to the evaluating, determining that the hierarchical data structure fails to satisfy at least one performance criterion; and
modifying a logical relationship among the two or more topical nodes based on the annotations and in response to determining that the data structure fails to satisfy the at least one performance criterion.

13. The method of claim 9, further comprising generating a training guideline based on the annotations to the nodes, the training guideline configured to provide instructions to an annotator for answering one or more annotation prompts for each document among the plurality of documents to be annotated.

14. The method of claim 1, wherein the hierarchical data structure comprises at least a third topical node and a fourth topical node, wherein the third and fourth topical nodes both represent sub-partitions within the topical theme of the first node and organized by a third and fourth topical theme, respectively, among the topical content of the training data within which the training data is to be subdivided into.

15. A non-transitory computer readable medium comprising instructions that, when executed by a processor, cause the processor to perform operations comprising:
ingesting training data representative of documents to be analyzed by a natural language model, wherein the training data includes at least one of a first document and a portion of the first document;
generating a hierarchical data structure, the hierarchical data structure comprising at least two topical nodes, wherein the at least two topical nodes represent partitions organized by two or more topical themes among the topical content of the training data within which the training data is to be subdivided into;
selecting among the training data a plurality of documents to be annotated;
determining, for each document among the plurality of documents, a level of ambiguity in interpreting said document that the natural language platform is trying to resolve, wherein the level of ambiguity is dependent upon information currently possessed by the natural language platform;

generating an annotation prompt for each document among the plurality of documents to be annotated, said annotation prompt being dynamically generated as either a first level prompt corresponding to a first level of specificity or a second level prompt corresponding to a second level of specificity, wherein both the first level prompt and the second level prompt comprise a human readable textual instruction worded according to the first level of specificity or the second level of specificity, and the first level prompt and the second level prompt are presented alternatively, the first level of specificity and the second level of specificity corresponding to the level of ambiguity of said document, said annotation prompt configured to elicit an annotation about said document designed to resolve said level of ambiguity and indicating which node among the at least two topical nodes of the hierarchical data structure said document is to be classified into, wherein the first level of specificity comprises a first level of true-or-false question and the second level of specificity comprises a multiple-choice question comprising at least three options, wherein the first level of specificity corresponds to a lower level of ambiguity than the second level of specificity;

causing display of the at least one annotation prompt for each document among the plurality of documents to be annotated;

receiving for each document among the plurality of documents to be annotated, the annotation in response to the displayed annotation prompt; and generating the natural language model using an adaptive machine learning process configured to determine, among the received annotations, patterns for how the documents in the training data are to be subdivided according to the at least two topical nodes of the hierarchical data structure.

16. The computer readable medium of claim 15, wherein the operations further comprise:

testing performance of the natural language model using a subset of the documents among the training data that received annotations.

17. The computer readable medium of claim 16, wherein the operations further comprise:

computing a performance metric of the natural language model, based on results of the testing; and determining whether the natural language model satisfies at least one performance criterion based on the computed performance metric.

18. The computer readable medium of claim 17, wherein the operations further comprise:

determining that the natural language platform fails to satisfy the at least one performance criterion based on the computed performance metric;

in response to said determining:

identifying a topical node among the two or more topical nodes of the hierarchical data structure that the natural language model fails to accurately categorize documents into;

selecting a second plurality of documents to be annotated that were not previously annotated, the second plurality comprising documents associated with said topical node that the natural language model failed to accurately categorize documents into;

generating a second set of annotation prompts comprising an annotation prompt for each document among the second plurality of documents to be annotated, said annotation prompt among the second set comprising a human readable textual communication that is configured to elicit an annotation about said document to improve the natural language model in accurately categorizing documents into said topical node;

causing display of the second set of annotation prompts for documents among the second plurality of documents to be annotated;

receiving, by the natural language platform, for documents among the second plurality of documents to be annotated, a second set of annotations in response to the second set of displayed annotation prompts; and generating, by the natural language platform, a refined natural language model using the adaptive machine learning process and based on the hierarchical data structure, the training data and the second set of annotations.

19. The computer readable medium of claim 15, wherein generating the hierarchical data structure comprises:

generating at least one annotation prompt for each topical node among the two or more topical nodes in the hierarchical data structure, said annotation prompt configured to elicit an annotation about said topical node indicating a level of accuracy of placement of the node within the hierarchical data structure;

causing display of the at least one annotation prompt for each topical node; and receiving for each topical node, the annotation in response to the displayed annotation prompt.

* * * * *

UNITED STATES PATENT AND TRADEMARK OFFICE
CERTIFICATE OF CORRECTION

| | | |
|---|---|---|
| PATENT NO. | : 10,127,214 B2 | Page 1 of 1 |
| APPLICATION NO. | : 14/964517 | |
| DATED | : November 13, 2018 | |
| INVENTOR(S) | : Robert J. Munro et al. | |

It is certified that error appears in the above-identified patent and that said Letters Patent is hereby corrected as shown below:

On the Title Page

Remove item (73) Assignee: "Sansa Al Inc., San Francisco, CA (US)".

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*